US012681398B1

(12) United States Patent
Arai et al.

(10) Patent No.: US 12,681,398 B1
(45) Date of Patent: Jul. 14, 2026

(54) IMAGE FORMING DEVICE AND PROCESS CARTRIDGE

(71) Applicant: FUJIFILM Business Innovation Corp., Tokyo (JP)

(72) Inventors: Soichiro Arai, Kanagawa (JP); Yasuko Torii, Kanagawa (JP); Yosuke Tsurumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/068,148

(22) Filed: Mar. 3, 2025

(30) Foreign Application Priority Data

Mar. 25, 2024 (JP) ................................ 2024-048749

(51) Int. Cl.
*G03G 9/08* (2006.01)
*G03G 9/097* (2006.01)
(Continued)

(52) U.S. Cl.
CPC ......... *G03G 9/0819* (2013.01); *G03G 9/0827* (2013.01); *G03G 9/09708* (2013.01); *G03G 21/0011* (2013.01); *G03G 21/1814* (2013.01)

(58) Field of Classification Search
CPC ............... G03G 9/0819; G03G 9/0827; G03G 9/09708; G03G 21/0011; G03G 21/1814
See application file for complete search history.

(56) References Cited

U.S. PATENT DOCUMENTS

| | | | |
|---|---|---|---|
| 5,547,796 | A | 8/1996 | Kohtaki et al. |
| 10,274,851 | B2 | 4/2019 | Hashimoto et al. |

(Continued)

FOREIGN PATENT DOCUMENTS

| | | |
|---|---|---|
| JP | 2020-034651 A | 3/2020 |
| JP | 2023-047228 A | 4/2023 |

OTHER PUBLICATIONS

Jul. 25, 2025 Extended Search Report issued in European Patent Application No. 25161727.0.

*Primary Examiner* — Sophia S Chen
(74) *Attorney, Agent, or Firm* — Oliff PLC

(57) ABSTRACT

An image forming device includes an image holding member, a charging device configured to charge a surface of the image holding member, an electrostatic charge image forming device configured to form an electrostatic charge image on the surface of the image holding member that has been charged, a developing device configured to contain a developer containing toner, supply the developer, and develop the electrostatic charge image formed on the surface of the image holding member into a toner image, a transfer device configured to transfer the toner image formed on the surface of the image holding member onto a surface of a recording medium, a cleaning device including a cleaning blade configured to clean the surface of the image holding member, and a fixing device configured to fix the toner image on the surface of the recording medium, in which the cleaning blade recovers a recovered toner containing toner particles and metal titanate particles, and the metal titanate particles exhibit a particle size distribution curve satisfying Expression (1), Expression (1). $1.4 \leq 2b/(a+b) \leq 1.95$, where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

12 Claims, 3 Drawing Sheets

(51) Int. Cl.
*G03G 21/00* (2006.01)
*G03G 21/18* (2006.01)

(56) References Cited

U.S. PATENT DOCUMENTS

| | | | | |
|---|---|---|---|---|
| 2020/0073263 | A1 | 3/2020 | Hama et al. | |
| 2023/0101891 | A1 | 3/2023 | Tsurumi et al. | |
| 2023/0168598 | A1* | 6/2023 | Iguchi | 430/108.6 |
| 2024/0094651 | A1* | 3/2024 | Sakai | G03G 9/0819 |

* cited by examiner

IMAGE FORMING DEVICE AND PROCESS CARTRIDGE

CROSS-REFERENCE TO RELATED APPLICATIONS

This application is based on and claims priority under 35 USC 119 from Japanese Patent Application No. 2024-048749 filed Mar. 25, 2024.

BACKGROUND

(i) Technical Field

The present disclosure relates to an image forming device and a process cartridge.

(ii) Related Art

Japanese Unexamined Patent Application Publication No. 2020-34651 proposes "a toner including a toner particle that contains a binder resin; and an inorganic fine particle, the inorganic fine particle containing aggregated particles that contain primary particles of at least one metal salt selected from the group consisting of titanate metal salts and zirconate metal salts; the primary particles having a number-average particle diameter of 15 to 55 nm; and the aggregated particles having an aggregation diameter of 80 to 300 nm and a volume resistivity of $2\times10^9$ to $2\times10^{13}$ Ω·cm, wherein a coverage ratio of the aggregated particles with respect to the surface of the toner particle is 0.3 to 10.0 area %.

Japanese Unexamined Patent Application Publication No. 2023-47228 proposes "an electrostatic charge image developing toner including toner particles; and an external additive that contains particles A containing a perovskite-type compound and having an equivalent circle diameter of 15 nm or greater and 90 nm or less and particles B containing a perovskite-type compound and having an equivalent circle diameter of 1.0 μm or greater and 3.0 μm or less, wherein the particles B occupy 0.3% by number or greater and 3.5% by number or less of an entirety of the toner particles".

SUMMARY

Aspects of non-limiting embodiments of the present disclosure relate to an image forming device including an image holding member, a charging device configured to charge a surface of the image holding member, an electrostatic charge image forming device configured to form an electrostatic charge image on the surface of the image holding member that has been charged, a developing device configured to contain a developer containing toner, supply the developer, and develop the electrostatic charge image formed on the surface of the image holding member into a toner image, a transfer device configured to transfer the toner image formed on the surface of the image holding member onto a surface of a recording medium, a cleaning device including a cleaning blade configured to clean the surface of the image holding member, and a fixing device configured to fix the toner image on the surface of the recording medium, in which the cleaning blade recovers a recovered toner containing toner particles and metal titanate particles, and the image forming device inhibits generation of color streaks that are generated upon forming an image having a low image density in a high-temperature and high-humidity environment after an image having a high image density is repeatedly formed, compared to an image forming device in which the metal titanate particles exhibit a particle size distribution curve not satisfying Expression (1).

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming device including an image holding member, a charging device configured to charge a surface of the image holding member, an electrostatic charge image forming device configured to form an electrostatic charge image on the surface of the image holding member that has been charged, a developing device configured to contain a developer containing toner, supply the developer, and develop the electrostatic charge image formed on the surface of the image holding member into a toner image, a transfer device configured to transfer the toner image formed on the surface of the image holding member onto a surface of a recording medium, a cleaning device including a cleaning blade configured to clean the surface of the image holding member, and a fixing device configured to fix the toner image on the surface of the recording medium, in which the cleaning blade recovers a recovered toner containing toner particles and metal titanate particles, and the metal titanate particles exhibit a particle size distribution curve satisfying Expression (1), Expression (1): $1.4\leq 2b/(a+b)\leq 1.95$, where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

BRIEF DESCRIPTION OF THE DRAWINGS

Exemplary embodiments of the present disclosure will be described in detail based on the following figures, wherein.

DETAILED DESCRIPTION

Figure 1:
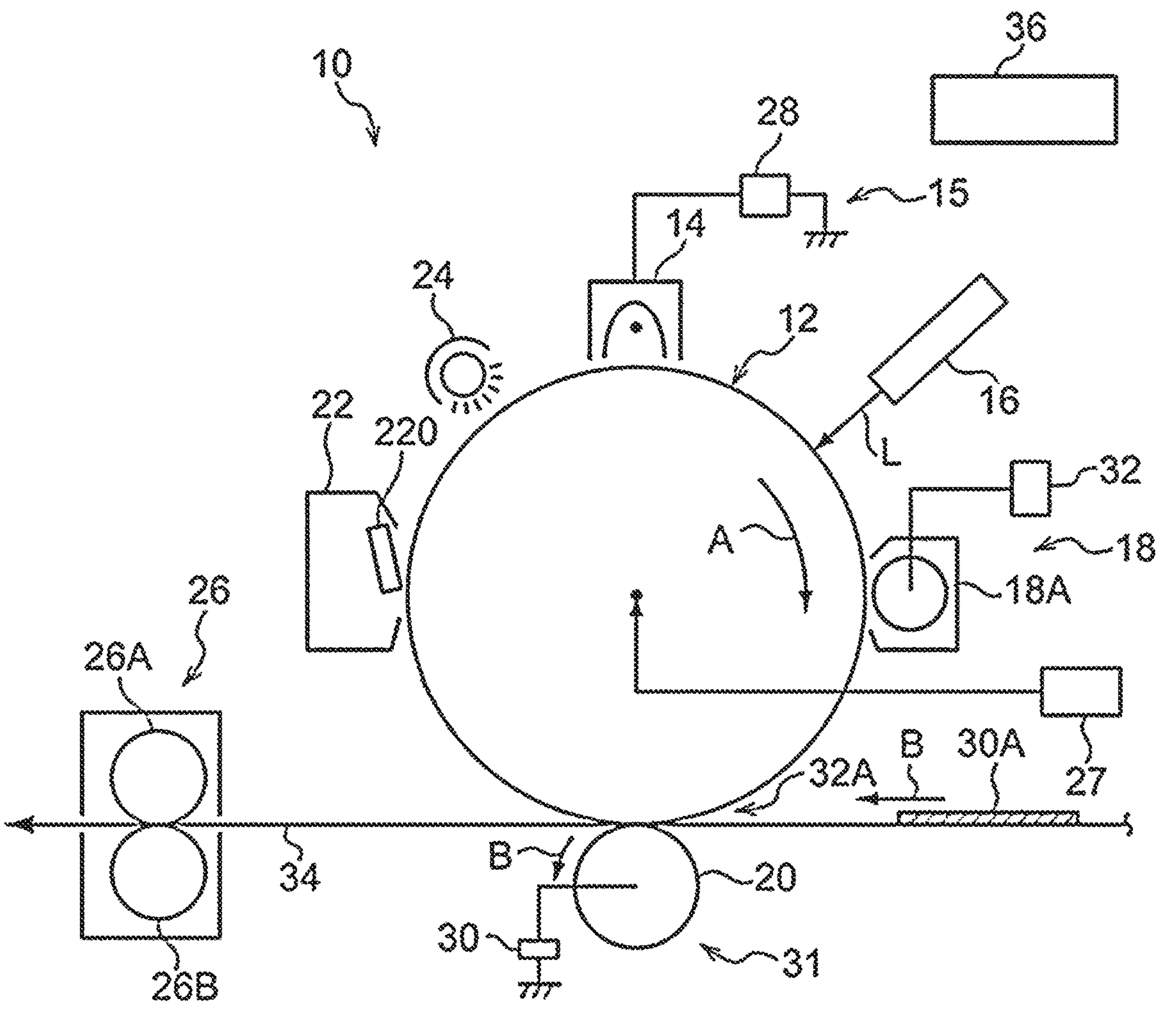
FIG. 1 is a schematic configuration view illustrating an example of an image forming device according to the present exemplary embodiment.

Hereinafter, exemplary embodiments that are examples of the present disclosure will be described. These descriptions and examples are illustrative of exemplary embodiments and are not intended to limit the scope of the present disclosure.

In numerical ranges described stepwise in the present specification, an upper limit value or a lower limit value described in one numerical range may be replaced with an upper limit value or a lower limit value of another stepwise numerical range. In a numerical range described in the present specification, an upper limit value or a lower limit value of the numerical range may be replaced with a value specified in examples.

Each component may contain a plurality of corresponding substances.

When referring to the amount of each component in a composition, in a case where a plurality of kinds of substances corresponding to each component are present in the composition, the amount means the total amount of the plurality of kinds of substances present in the composition, unless otherwise specified.

Image Forming Device

The image forming device according to the present exemplary embodiment includes

- an image holding member,
- a charging device configured to charge a surface of the image holding member,
- an electrostatic charge image forming device configured to form an electrostatic charge image on the surface of the image holding member that has been charged,
- a developing device configured to contain a developer containing toner, supply the developer, and develop the electrostatic charge image formed on the surface of the image holding member into a toner image,
- a transfer device configured to transfer the toner image formed on the surface of the image holding member onto a surface of a recording medium,
- a cleaning device including a cleaning blade configured to clean the surface of the image holding member, and
- a fixing device configured to fix the toner image on the surface of the recording medium.

The cleaning blade recovers a recovered toner containing toner particles and metal titanate particles.

In addition, the particle size distribution curve of the metal titanate particle satisfies Expression (1) described below.

With the above-described configuration, the image forming device according to the present exemplary embodiment inhibits the generation of color streaks that are generated upon forming an image having a low image density in a high-temperature and high-humidity environment after an image having a high image density is repeatedly formed. The reason therefor is presumed as follows.

In the related art, a polishing agent is used as an external additive for a toner in order to remove discharge products and the like adhering to an image holding member at the time of charging. A suitable polishing agent is metal titanate particles because a metal titanate particle is a particle having a cubic, rectangular parallelepiped or other shape, high crystallinity, and high resistance.

Here, when an image having a high image density is repeatedly formed, the amount of toner that reaches the contact portion between the image holding member and the cleaning blade (hereinafter, also referred to as a "blade contact portion") increases. Therefore, the amount of the discharge product adhering to the image holding member also increases, but the amount of the polishing agent that reaches the blade contact portion also increases. Accordingly, the amount of the polishing agent retaining at the blade contact portion is sufficient, and the cleaning performance is also improved.

However, when an image having a low image density is formed after an image having a high image density is repeatedly formed, the amount of the toner that reaches the blade contact portion decreases even in a state where the amount of the discharge product adhering to the image holding member increases. Thus, the amount of the polishing agent that reaches the blade contact portion also decreases. Therefore, the amount of the polishing agent retaining at the blade contact portion decreases, the polishing action caused by the polishing agent is reduced, and the cleaning performance is degraded. As a result, color streaks are likely to be generated.

In view of the above, the image forming device according to the present exemplary embodiment adopts metal titanate particles that exhibit a particle size distribution curve satisfying Expression (1). The adoption of the metal titanate particles having such a particle size distribution makes it easy to regularly retain and dispose metal titanate particles having a small diameter, a medium diameter, and a large diameter from the downstream side in the rotation direction of the image holding member at the blade contact portion.

Regularly retaining and disposing metal titanate particles at the blade contact portion increases the amount of filling the retention portion (i.e., a polishing layer containing metal titanate particles) with particles, and as a result, the retention portion is less likely to collapse and is stable. This facilitates the exhibition of the polishing action of metal titanate particles even when the retention amount decreases. Therefore, the cleaning performance is improved, and color streaks are less likely to be generated.

When a part of metal titanate particles of a toner in a developer contained in the developing device is developed into a toner image, the metal titanate particles may have a particle size distribution different from that of metal titanate particles of the recovered toner recovered by the blade. Metal titanate particles as the polishing agent have a plurality of particle diameter ranges. With this feature, metal titanate particles having a particle diameter that is a certain particle diameter or less strongly adhere to the toner, and only metal titanate particles having a particle diameter that is the certain particle diameter or more are selectively supplied into the recovered toner. This allows particles in the recovered toner to exhibit a particle diameter distribution that cannot be obtained by metal titanate particles having a single particle diameter.

Therefore, color streaks are less likely to be generated due to metal titanate particles in the recovered toner recovered by the blade that exhibit the particle size distribution curve satisfying Expression (1).

From the above, it is presumed that the image forming device according to the present exemplary embodiment inhibits the generation of color streaks which is generated upon forming an image having a low image density in a high-temperature and high-humidity environment after an image having a high image density is repeatedly formed.

Note that the reason why the particle size distribution curve of metal titanate particles in the recovered toner is adopted in the image forming device according to the present exemplary embodiment is that the amount of metal titanate particles in the recovered toner is large compared to the amount of metal titanate particles in the toner of the developer contained in the developing device is small, and thus the measurement accuracy of the particle size distribution of metal titanate particles is high.

Here, as the image forming device according to the present exemplary embodiment, one of the following well-known image forming devices is applied: a direct transfer type device that directly transfers a toner image formed on a surface of an image holding member onto a recording medium; an intermediate transfer type device that primarily transfers a toner image formed on a surface of an image holding member onto a surface of an intermediate transfer member and secondarily transfers the toner image transferred onto the surface of the intermediate transfer member onto a surface of a recording medium; a device including a discharging device that discharges a surface of an image holding member by irradiating the surface with discharging light after transfer of the toner image and before charging of the image holding member; and a device including an image holding heating member for increasing the temperature of an image holding member and decreasing the relative temperature.

In the case of the intermediate transfer type device, for example, the following configuration is applied to the transfer device. That is, a configuration including: an intermediate transfer member having a surface onto which a toner image is transferred; a primary transfer device that primarily transfers the toner image formed on the surface of an image holding member onto the surface of the intermediate transfer member; and a secondary transfer device that secondarily transfers the toner image transferred onto the surface of the intermediate transfer member onto the surface of the recording medium, is applied.

The image forming device according to the present exemplary embodiment may be any of an image forming device of a dry development type, or an image forming device a wet development type (a development type using a liquid developer).

Note that, in the image forming device according to the present exemplary embodiment, for example, a portion including the electrophotographic photoreceptor may have a cartridge structure (process cartridge) that is attachable to and detachable from the image forming device. Examples of the process cartridge include devices each including: an image holding member; a charging device; an electrostatic latent image forming device; and a developing device.

Hereinafter, an example of the image forming device according to the present exemplary embodiment will be described, but the present disclosure is not limited thereto. Main parts illustrated in the drawings will be described, and description of other parts will be omitted.

FIG. 1 is a schematic configuration view illustrating an example of an image forming device according to the present exemplary embodiment.

As illustrated in FIG. 1, an image forming device 10 according to the present exemplary embodiment includes, for example, a photoreceptor 12. The photoreceptor (an example of the image holding member) 12 has a cylindrical shape and is coupled to a drive unit 27 such as a motor with a driving force transmission member (not illustrated), such as a gear, interposed therebetween. The drive unit 27 rotationally drives the photoreceptor 12 around a rotation axis indicated by a black dot. In the example illustrated in FIG. 1, the photoreceptor 12 is rotationally driven in the direction of arrow A.

In the space surrounding the photoreceptor 12, for example, a charging device 15, an electrostatic charge image forming device 16, a developing device 18, a transfer device 31, a cleaning device 22, and a discharging device 24 are disposed in this order along the rotation direction of the photoreceptor 12. The image forming device 10 further includes a fixing device 26. The fixing device 26 includes a fixing member 26A and a pressure member 26B disposed in contact with the fixing member 26A. The image forming device 10 further includes a control device 36 that controls the operation of each device (each unit). Note that a unit including the photoreceptor 12, the charging device 15, the electrostatic charge image forming device 16, the developing device 18, the transfer device 31, and the cleaning device 22 corresponds to an image forming unit.

In the image forming device 10, at least the photoreceptor 12, the developing device 18, and the cleaning device 22 may be provided as a process cartridge integrated with other devices.

Hereinafter, each device (each unit) of the image forming device 10 will be described in detail.

Photoreceptor

The photoreceptor 12 includes a photosensitive layer.

The photosensitive layer may be a single-layer photosensitive layer in which a charge generation material and a charge transport material are contained in the same photosensitive layer and the functions are integrated, or may be a laminated photosensitive layer in which the functions of the charge generation layer and the charge transport layer are separated. When the photosensitive layer is a laminated photosensitive layer, the order of the charge generation layer and the charge transport layer is not particularly limited, but the photoreceptor preferably has a configuration in which the charge generation layer, the charge transport layer, and the surface protection layer are provided in this order on the conductive substrate. The photoreceptor may include a layer other than these layers.

Charging Device

The charging device 15 charges the surface of the photoreceptor 12. The charging device 15 includes, for example, a charging member 14 and a power supply 28 (an example of a voltage applying unit for the charging member). The charging member 14 is provided in contact or non-contact with the surface of the photoreceptor 12 and charges the surface of the photoreceptor 12. The power supply 28 applies a charging voltage to the charging member 14. The power supply 28 is electrically coupled to the charging member 14.

Examples of the charging member 14 of the charging device 15 include contact-type chargers using, for example, conductive charging rollers, charging brushes, charging films, charging rubber blades, or charging tubes. Other examples of the charging member 14 include chargers that are known in itself, such as a non-contact type roller charger and a scorotron charger or a corotron charger using corona discharge.

Electrostatic Charge Image Forming Device

The electrostatic charge image forming device 16 forms an electrostatic charge image on the surface of the charged photoreceptor 12. Specifically, for example, the electrostatic charge image forming device 16 irradiates the surface of the photoreceptor 12 charged by the charging member 14 with light L modulated based on image information of an image to be formed, and forms an electrostatic charge image corresponding to the image of the image information onto the photoreceptor 12.

Examples of the electrostatic charge image forming device 16 include optical devices including a light source for imagewise exposure using light such as semiconductor laser light, LED light, or liquid crystal shutter light.

Developing Device

The developing device 18 is provided, for example, downstream in the rotation direction of the photoreceptor 12 with respect to the irradiation position of the light L by the electrostatic charge image forming device 16. The developing device 18 includes a container that contains a developer. A developer containing toner is contained in the container. A toner is contained, for example, in a charged state in the developing device 18.

The developing device 18 includes, for example, a developing member 18A and a power supply 32. The developing member 18A develops the electrostatic charge image formed on the surface of the photoreceptor 12 by using a developer containing toner. The power supply 32 applies a developing voltage to the developing member 18A. The developing member 18A is electrically coupled to, for example, the power supply 32.

The developing member 18A of the developing device 18 is selected in accordance with the type of developer. Examples of the developing member 18A include a developing roll including a developing sleeve with a built-in magnet.

The developing device 18 (including the power supply 32) is electrically coupled to, for example, the control device 36 provided in the image forming device 10. The developing device 18 is driven and controlled by the control device 36 and applies a developing voltage to the developing member 18A. The developing member 18A to which the developing voltage is applied is charged to a developing potential corresponding to the developing voltage. For example, the developing member 18A charged to the developing potential retains the developer contained in the developing device 18, and supplies the toner contained in the developer from the developing device 18 to the surface of the photoreceptor 12. The formed electrostatic charge image is developed into a toner image on the surface of the photoreceptor 12 to which the toner is supplied.

Transfer Device

The transfer device 31 is provided, for example, downstream in the rotation direction of the photoreceptor 12 with respect to the position where the developing member 18A is disposed. The transfer device 31 includes, for example, a transfer member 20 and a power supply 30. The transfer member 20 transfers the toner image formed on the surface of the photoreceptor 12 onto a recording medium 30A. The power supply 30 applies a transfer voltage to the transfer member 20. The transfer member 20 has, for example, a cylindrical shape, and transports the recording medium 30A while sandwiching the recording medium 30A between the transfer member 20 and the photoreceptor 12. The transfer member 20 is electrically coupled to, for example, the power supply 30.

Examples of the transfer member 20 include contact type transfer chargers using a belt, a roller, a film, or a rubber cleaning blade; and non-contact type transfer chargers that are known in itself, such as a scorotron transfer charger or a corotron transfer charger using corona discharge.

The transfer device 31 (including the power supply 30) is electrically coupled to, for example, the control device 36 provided in the image forming device 10, and is driven and controlled by the control device 36 to apply a transfer voltage to the transfer member 20. The transfer member 20 to which the transfer voltage is applied is charged to a transfer potential corresponding to the transfer voltage.

When a transfer voltage having a polarity opposite to that of the toner constituting the toner image formed on the photoreceptor 12 is applied from the power supply 30 of the transfer member 20 to the transfer member 20, for example, a transfer electric field having an electric field strength with which each toner constituting the image on the photoreceptor 12 is moved from the photoreceptor 12 to the transfer member 20 side by an electrostatic force is formed in a region where the photoreceptor 12 and the transfer member 20 oppose each other (see a transfer region 32A in FIG. 1).

For example, the recording medium 30A is accommodated in an accommodation unit (not illustrated). The recording medium 30A is transported from the accommodation unit along a transport path 34 by a plurality of transport members (not illustrated), and reach the transfer region 32A that is a region where the photoreceptor 12 and the transfer member 20 oppose each other. In the example illustrated in FIG. 1, the recording medium 30A is transported in the direction of arrow B. The toner image on the photoreceptor 12 is transferred onto the recording medium 30A that has reached the transfer region 32A by, for example, a transfer electric field formed in the region by applying a transfer voltage to the transfer member 20. That is, the toner image is transferred onto the recording medium 30A by, for example, the movement of the toner from the surface of the photoreceptor 12 to the recording medium 30A. The toner image on the photoreceptor 12 is transferred onto the recording medium 30A by the transfer electric field.

Cleaning Device

The cleaning device 22 includes a cleaning blade 220 that cleans the surface of the photoreceptor 12. The leading end of the cleaning blade 220 is brought into contact with the photoreceptor 12 in a direction opposite to the rotation direction of the photoreceptor 12, and an adhering substance on the surface of the photoreceptor 12 is removed.

The cleaning device 22 is provided downstream in the rotation direction of the photoreceptor 12 with respect to the transfer device 31. The cleaning device 22 transfers the toner image onto the recording medium 30A and cleans residual toner and the like adhering to the photoreceptor 12. Specifically, the cleaning device 22 cleans not only the residual toner but also an adhering substance such as a discharge product generated by the charging unit and paper powder.

Here, the cleaning device 22 will be described with reference to FIG. 2.

Figure 2:
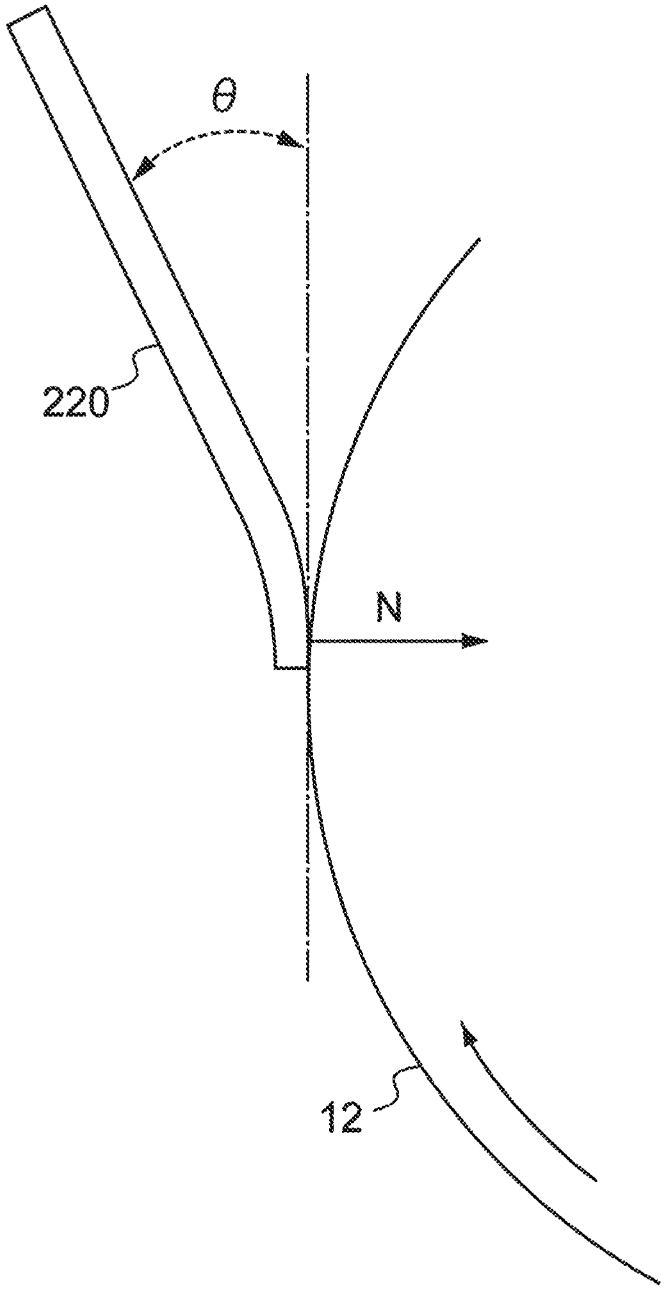
FIG. 2 is an enlarged view illustrating a position where a cleaning blade and a photoreceptor are in contact with each other in the image forming device of FIG. 1 in an enlarged manner.

FIG. 2 is a schematic configuration view illustrating a form of installing the cleaning blade 220 in the cleaning device 22 illustrated in FIG. 1.

As illustrated in FIG. 2, the leading end of the cleaning blade 220 is oriented to a direction opposite to the rotation direction of the photoreceptor 12 (arrow direction), and is in contact with the surface of the photoreceptor 12 in this state.

An angle θ between the cleaning blade 220 and the photoreceptor 12 is preferably set to 5° or more and 35° or less, more preferably 10° or more and 25° or less.

Pressing pressure N of the cleaning blade 220 against the photoreceptor 12 is preferably set to 0.6 $gf/mm^2$ or more and 6.0 $gf/mm^2$ or less.

Here, as illustrated in FIG. 2, the above-described angle θ specifically refers to an angle formed by a non-deformed portion of the cleaning blade 220 and a tangent line at a contact portion between the leading end of the cleaning blade 220 and the photoreceptor 12 (one-dot chain line in FIG. 2).

As illustrated in FIG. 2, the above-described pressing pressure N is a pressure ($gf/mm^2$) with which the cleaning blade 220 is pressed toward the center of the photoreceptor 12 at a position where the cleaning blade 220 is in contact with the photoreceptor 12.

Note that the cleaning blade 220 in the present exemplary embodiment is a plate-shaped member having elasticity.

A support member (not illustrated in FIG. 2) is joined to a surface of the cleaning blade 220 opposite to the surface in contact with the photoreceptor 12, and the cleaning blade 220 is supported by the support member. The cleaning blade 220 is pressed against the photoreceptor 12 with the above-described pressing pressure by the support member. Examples of the support member include metal materials such as aluminum and stainless steel. Note that an adhesive layer including an adhesive or the like for joining the supporting member and the cleaning blade 220 may be provided therebetween.

The cleaning device may include a known member in addition to the cleaning blade 220 and the support member that supports the cleaning blade 220.

The contact portion of the cleaning blade 220 that comes into contact with at least the photoreceptor 12 includes, for example, polyurethane rubber.

The polyurethane rubber is a polyurethane rubber obtained by polymerizing at least a polyol component and a polyisocyanate component. The polyurethane rubber may be a polyurethane rubber obtained by polymerizing, if necessary, a resin having a functional group other than polyol components, which is capable of reacting with the isocyanate group of polyisocyanate.

The polyurethane rubber desirably includes a hard segment and a soft segment. The "hard segment" and the "soft segment" mean segments in the polyurethane rubber material, in which the material constituting the former is relatively harder than the material constituting the latter, and the material constituting the latter is relatively softer than the material constituting the former.

Examples of the material constituting the hard segment (hard segment material) include low molecular weight polyol components among polyol components, and resins having a functional group capable of reacting with the isocyanate group of polyisocyanate. On the other hand, examples of the material constituting the soft segment (soft segment material) include polymer polyol components among polyol components.

The configuration of the polyurethane rubber is not particularly limited, and a well-known polyurethane rubber generally adopted for the cleaning blade 220 is adopted.

Discharging Device

The discharging device 24 is provided, for example, downstream in the rotation direction of the photoreceptor 12 with respect to the cleaning device 22. After the toner image is transferred, the discharging device 24 exposes the surface of the photoreceptor 12 to light and discharges the surface. Specifically, for example, the discharging device 24 is electrically coupled to the control device 36 provided in the image forming device 10. The discharging device 24 is driven and controlled by the control device 36, exposes the entire surface of the photoreceptor 12 (specifically, for example, the entire surface of the image forming region) to light, and discharges the entire surface.

Examples of the discharging device 24 include devices including a light source such as a tungsten lamp that emits white light and a light-emitting diode (LED) that emits red light.

Fixing Device

The fixing device 26 is provided, for example, downstream in the transport direction of the transport path 34 for the recording medium 30A with respect to the transfer region 32A. The fixing device 26 includes the fixing member 26A and the pressure member 26B disposed in contact with the fixing member 26A. The fixing device 26 fixes the toner image transferred onto the recording medium 30A at a contact portion between the fixing member 26A and the pressure member 26B. Specifically, for example, the fixing device 26 is electrically coupled to the control device 36 provided in the image forming device 10, and is driven and controlled by the control device 36. In this way, the toner image transferred onto the recording medium 30A is fixed to the recording medium 30A by heat and pressure.

Examples of the fixing device 26 include fixing machines that are known in itself, such as a heat roller fixing machine and an oven fixing machine.

Specifically, applicable examples of the fixing device 26 include known fixing devices including a fixing roll or a fixing belt as the fixing member 26A, and a pressure roll or a pressure belt as the pressure member 26B.

Here, the recording medium 30A onto which the toner image is transferred by being transported along the transport path 34 and passing through a region where the photoreceptor 12 and the transfer member 20 oppose each other (transfer region 32A) is, for example, further transported along the transport path 34 by a transport member (not illustrated) and reaches a position where the fixing device 26 is installed. As a result, the toner image on the recording medium 30A is fixed.

The recording medium 30A onto which an image is formed by fixing the toner image is discharged to the outside of the image forming device 10 by a plurality of transport members (not illustrated). Note that the photoreceptor 12 is charged again to the charging potential by the charging device 15 after the discharge by the discharging device 24.

Operation of Image Forming Device

An example of the operation of the image forming device 10 according to the present exemplary embodiment will be described. Various operations of the image forming device 10 are performed by a control program executed by the control device 36.

The image forming operation of the image forming device 10 will be described.

First, the surface of the photoreceptor 12 is charged by the charging device 15. The electrostatic charge image forming device 16 exposes the surface of the charged photoreceptor 12 to light based on image information. In this way, an electrostatic charge image corresponding to the image information is formed on the photoreceptor 12. In the developing device 18, the electrostatic charge image formed on the surface of the photoreceptor 12 is developed by using a developer containing toner. A toner image is thus formed on the surface of the photoreceptor 12.

The toner image formed on the surface of the photoreceptor 12 is transferred onto the recording medium 30A at the transfer device 31. The toner image transferred onto the recording medium 30A is fixed by the fixing device 26.

On the other hand, the surface of the photoreceptor 12 after the toner image is transferred is cleaned by the cleaning blade 220 of the cleaning device 22, and then the surface of the photoreceptor 12 is discharged by the discharging device 24.

Recovered Toner

Hereinafter, the recovered toner recovered by the cleaning blade 220 in the image forming device 10 will be described. Reference numerals are omitted in the following description.

The recovered toner contains toner particles and metal titanate particles. The recovered toner may contain an external additive other than metal titanate particles.

Note that the details of the components and the like of the recovered toner are the same as those of the toner contained in the developer contained in the developing device, and therefore will be described in the section pertaining to the details of the developer.

Particle Size Distribution Curve

The particle size distribution curve of metal titanate particles in the recovered toner satisfies the following Expression (1), preferably satisfies the following Expression (2), more preferably satisfies the following Expression (3).

$$1.4 \leq 2b/(a+b) \leq 1.95 \qquad \text{Expression (1)}$$

-continued $$1.6 \leq 2b/(a+b) \leq 1.9 \quad \text{Expression (2)}$$

$$1.6 \leq 2b/(a+b) \leq 1.85 \quad \text{Expression (3)}$$

Figure 3:
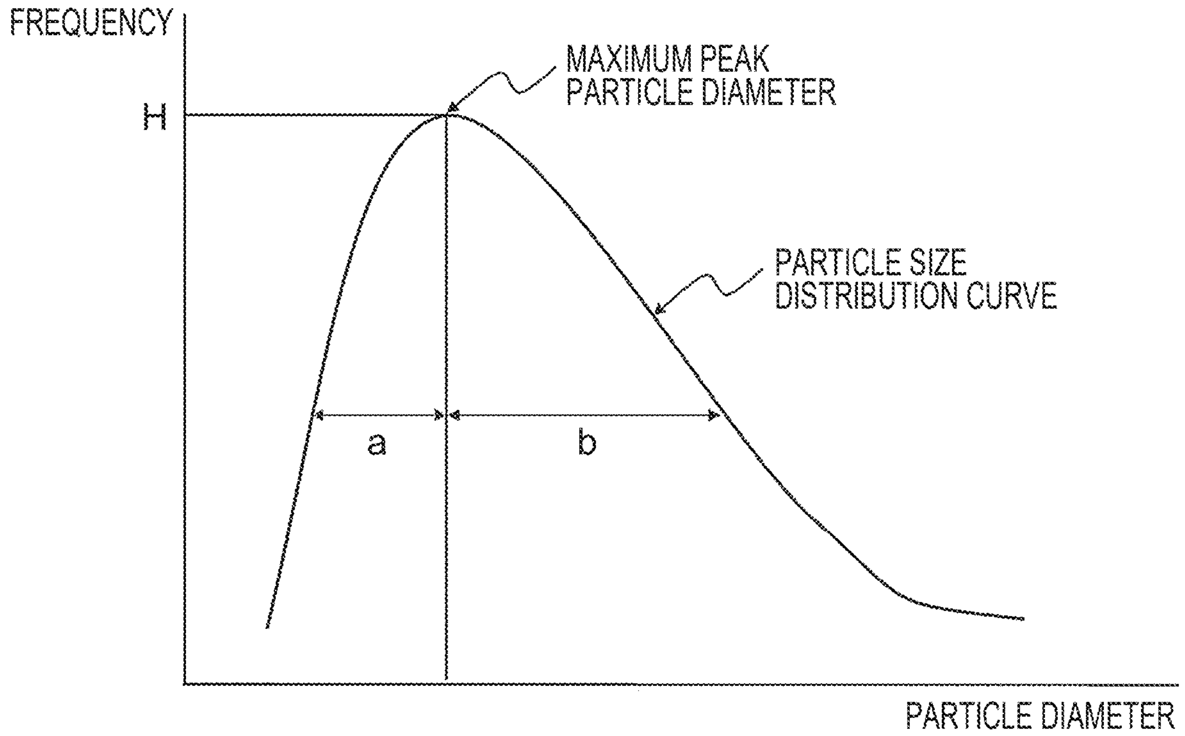
FIG. 3 is a schematic graph for describing a particle size distribution curve of a recovered toner in the present exemplary embodiment.

In Expressions (1) to (3), a represents a width (unit: μm) on the smaller diameter side with respect to a perpendicular line, which is drawn from the maximum peak of the particle size distribution curve, at a 50% height of the maximum peak height, and b represents a width (unit: μm) on the larger diameter side with respect to the perpendicular line at the 50% height of the maximum peak height (see FIG. 3).

When the value of "2b/(a+b)" is more than 1.95, the amount of large-diameter particles of metal titanate particles increases, and the load on the cleaning blade increases. This allows metal titanate particles to slip through the cleaning blade, and color streaks are likely to be generated.

When the value of "2b/(a+b)" is less than 1.4, the particle size of metal titanate particles exhibits a narrow distribution. This makes it difficult to regularly retain and dispose metal titanate particles having a small diameter, a medium diameter, and a large diameter from the downstream side in the rotation direction of the image holding member at the blade contact portion. Accordingly, metal titanate particles are less likely to be regularly retained and disposed at the blade contact portion. Therefore, the particle packing density of the retention portion decreases, making it difficult for metal titanate particles to exhibit the polishing action. As a result, the cleaning performance is degraded, and color streaks are likely to be generated.

The width b in the particle size distribution curve of metal titanate particles is preferably 0.5 μm or more and 2.0 μm or less, more preferably 0.75 μm or more and 1.5 μm or less, still more preferably 0.9 μm or more and 1.3 μm or less.

When the width b is 0.5 μm or more, the amount of the large-diameter particles of metal titanate particles is not excessively large, and the load on the cleaning blade decreases. This makes it difficult for metal titanate particles to slip through the cleaning blade. As a result, color streaks are less likely to be generated.

When the width b is 2.0 μm or less, the particle size of metal titanate particles exhibits a moderately broad distribution, which makes it easy to regularly retain and dispose metal titanate particles having a small diameter, a medium diameter, and a large diameter from the downstream side in the rotation direction of the image holding member at the blade contact portion. This makes it easy for metal titanate particles to be regularly retained and disposed at the blade contact portion. Therefore, the particle packing density of the retention portion increases, and the polishing action of metal titanate particles is easily exhibited. As a result, the cleaning performance is improved, and color streaks are less likely to be generated.

The maximum peak height (see H in FIG. 3) of the particle size distribution curve of metal titanate particles, which is represented by the frequency of particles in each particle diameter with respect to the total number of particles, is preferably 5% or more and 40% or less, more preferably 10% or more and 25% or less, still more preferably 15% or more and 20% or less.

When the maximum peak height of the frequency of metal titanate particles with respect to the total number of particles is 5% or more and 40% or less, the particle packing density of the retention portion (i.e., the polishing layer containing metal titanate particles) is increased at the blade contact portion, and the cleaning performance is improved. As a result, color streaks are less likely to be generated.

The particle diameter at the maximum peak in the particle size distribution curve of metal titanate particles is preferably 0.5 μm or more and 3.0 μm or less, more preferably 0.75 μm or more and 2.0 μm or less, still more preferably 1.0 μm or more and 1.5 μm or less. When the particle diameter at the maximum peak is 0.5 μm or more, the amount of metal titanate particles retaining at the blade contact portion increases, and the polishing action of metal titanate particles is easily exhibited. As a result, the cleaning performance is improved, and color streaks are less likely to be generated.

When the particle diameter at the maximum peak is 3.0 μm or less, the load on the cleaning blade due to the large-diameter particles of metal titanate particles is reduced. This makes it difficult for metal titanate particles to slip through the cleaning blade. As a result, color streaks are less likely to be generated.

Average Circularity

The average circularity of metal titanate particles is preferably 0.75 or more and 1.0 or less, more preferably 0.8 or more and 1.0 or less, still more preferably 0.85 or more and 1.0 or less.

When the average circularity is 0.75 or more and 1.0 or less, the particle packing density of the retention portion (i.e., the polishing layer containing metal titanate particles) at the blade contact portion is easily increased. This facilitates the exhibition of the polishing action of metal titanate particles even when the retention amount decreases. Therefore, the cleaning performance is improved, and color streaks are less likely to be generated.

Number Ratio

In the recovered toner, the number ratio of metal titanate particles to the toner particles is preferably 0.3 number % or more and 3.5 number % or less, more preferably 0.7 number % or more and 3.1 number % or less, still more preferably 0.9 number % or more and 2.9 number % or less.

When the number ratio is 0.3 number % or more, the amount of metal titanate particles retaining at the blade contact portion increases, and the polishing action of metal titanate particles is easily exhibited. As a result, the cleaning performance is improved, and color streaks are less likely to be generated.

When the number ratio is 3.5 number % or less, an excessive increase in the amount of metal titanate particles retaining at the blade contact portion is suppressed. This makes it difficult for metal titanate particles to slip through the cleaning blade, and thus, color streaks are less likely to be generated.

Method of Measuring Properties of Metal Titanate Particles

The methods of measuring the particle size distribution curve, the average circularity, and the number ratio of metal titanate particles in the recovered toner are as follows.

First, an unused image forming device in which an unused developer to be measured is contained in a developing device is prepared.

Next, in a high-temperature and high-humidity environment (28° C., 90% RH), an image (halftone image having an image density of 1%) formed by using a developer to be measured and an unused image forming device is output on the entire surfaces of 10000 sheets of A4 paper.

Next, the recovered toner recovered by the cleaning blade is collected from the image forming device after image formation. Specifically, the recovered toner cleaned by the cleaning blade is collected from a discharge pipe through which the recovered toner is transported.

Next, the collected recovered toner is observed at a magnification of 1500 times by using a scanning electron microscope (SEM; S-4800, manufactured by Hitachi High-Technologies Corporation) equipped with an energy dispersive X-ray spectrometer (EDX device; EMAX Evolution X-Max 80 $mm^2$, manufactured by Horiba, Ltd.).

Based on elemental analysis using an EDX device, 200 metal titanate particles are identified. When the number of particles present in one field of view is less than 200, the particles may be identified from a plurality of fields of view. The images of 200 metal titanate particles are analyzed by using image processing analysis software WinRoof (MITANI CORPORATION). Then, the equivalent circle diameter, the area, and the perimeter of the primary particle image of each metal titanate particle are obtained.

From the equivalent circle diameter of the obtained primary particle image, a cumulative distribution is drawn from the smaller diameter side on a number basis, and a particle size distribution curve of metal titanate particles is obtained.

Based on the area and the perimeter of the obtained primary particle image, the circularity of each metal titanate particle is obtained by the equation: Circularity=4Π×(Area of particle image)/(Perimeter of particle image)$^2$. The obtained circularities are then arithmetically averaged, and an average circularity is obtained.

On the other hand, the number ratio of metal titanate particles to the toner particles is obtained by observing the collected recovered toner. Provided, however, that the number ratio of metal titanate particles is an arithmetically averaged value of number ratios in 200 fields of view in observation of the recovered toner.

Note that the particle size distribution curve, the average circularity, and the number ratio of metal titanate particles are obtained by analyzing an image observed by the SEM equipped with the EMAX Evolution X-Max 80 $mm^2$ (manufactured by Horiba, Ltd.) using image processing analysis software WinRoof (Mitani Corporation).

Here, the particle size distribution of metal titanate particles can be controlled by, for example, various conditions at the time of producing metal titanate particles by a wet production method. The average circularity of metal titanate particles can be controlled by, for example, the species and amount of a dopant with which metal titanate particles are doped.

The number ratio of metal titanate particles to the toner particles can be controlled by the amount of metal titanate particles in toner in the developer contained in the developing device.

Developer

Hereinafter, the developer contained in the developing device 18 in the image forming device 10 will be described. Reference numerals are omitted in the following description.

The developer may be a one-component developer containing only a toner, or a two-component developer containing a toner and a carrier.

Toner

The toner contains toner particles and an external additive. Note that the external additive contains metal titanate particles.

Toner Particles

The toner particles may contain, for example, a binder resin. The toner particles may also contain a colorant, a release agent, internal additive resin particles, and other additives.

Binder Resin

Examples of the binder resin include vinyl resins each comprising a homopolymer of a monomer such as styrenes (e.g., styrene, parachlorostyrene, and α-methylstyrene), (meth)acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene); and vinyl resins each comprising a copolymer obtained by combining two or more of these monomers.

Examples of the binder resin include non-vinyl resins such as an epoxy resin, a polyester resin, a polyurethane resin, a polyamide resin, a cellulose resin, a polyether resin, and a modified rosin; mixtures of any of the non-vinyl resins and any of the aforementioned vinyl resins; and graft polymers obtained by polymerizing a vinyl monomer in the presence of these resins.

One of these binder resins may be used alone, or two or more of these may be used in combination.

A suitable binder resin is polyester resin.

Examples of the polyester resin include known amorphous polyester resins. As the polyester resin, a crystalline polyester resin may be used in combination with an amorphous polyester resin. Provide, however, that the crystalline polyester resin is suitably used in a content range of 2 mass % or more and 40 mass % or less (preferably 2 mass % or more and 20 mass % or less) per the total binder resin.

Note that the "crystallinity" of resin means that the resin has a clear endothermic peak rather than a stepwise endothermic change in differential scanning calorimetry (DSC), and specifically means that the half width of the endothermic peak measured at a rate of temperature increase of 10 (° C./min) is 10° C. or less.

On the other hand, the "amorphousness" of resin means that the resin has a half width of higher than 10° C., demonstrates a stepwise endothermic change, or does not have a clearly recognizable endothermic peak.

A suitable binder resin is polyester resin.

Examples of the polyester resin include known polyester resins.

Examples of the polyester resin include condensation polymers of a polyvalent carboxylic acid and a polyhydric alcohol. As the polyester resin, a commercially available product may be used, or a synthesized product may be used.

Examples of the polyvalent carboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), anhydrides thereof, and lower alkyl esters (e.g., an alkyl ester having one or more and five or less carbon atoms) thereof. Among these examples, a preferable example of the polyvalent carboxylic acid is an aromatic dicarboxylic acid.

As the polyvalent carboxylic acid, a trivalent or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower alkyl esters thereof (e.g., an alkyl ester having one or more and five or less carbon atoms).

One of the polyvalent carboxylic acids may be used alone, or two or more of these may be used in combination.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., an ethylene oxide adduct of bisphenol A and a propylene oxide adduct of bisphenol A). Among these examples, as the polyhydric alcohol, for example, an aromatic diol or an alicyclic diol is preferable, and an aromatic diol is more preferable.

As the polyhydric alcohol, a trihydric or higher polyhydric alcohol having a crosslinked structure or a branched structure may be used in combination with a diol. Examples of the trihydric or higher polyhydric alcohol include glycerin, trimethylolpropane, and pentaerythritol.

One of the polyhydric alcohols may be used alone, or two or more of these may be used in combination.

The glass transition temperature (Tg) of the polyester resin is preferably 50° C. or more and 80° C. or less, more preferably 50° C. or more and 65° C. or less.

Note that the glass transition temperature is determined from a differential scanning calorimetry (DSC) curve obtained by DSC. More specifically, the glass transition temperature is determined conforming to the "extrapolated glass transition starting temperature" described in the method of determining a glass transition temperature in JIS K 7121-1987 "Testing Methods for Transition Temperatures of Plastics".

The weight-average molecular weight (Mw) of the polyester resin is preferably 5000 or more and 1000000 or less, more preferably 7000 or more and 500000 or less.

The number-average molecular weight (Mn) of the polyester resin is preferably 2000 or more and 100000 or less.

The molecular weight distribution Mw/Mn of the polyester resin is preferably 1.5 or more and 100 or less, more preferably 2 or more and 60 or less.

Note that the weight-average molecular weight and the number-average molecular weight are measured by gel permeation chromatography (GPC). The molecular weight measurement by GPC is performed using the HLC-8120GPC, which is a GPC manufactured by Tosoh Corporation, as a measurement device; the TSKgel SuperHM-M (15 cm), which is a column manufactured by Tosoh Corporation; and a tetrahydrofuran (THF) solvent. The weight-average molecular weight and the number-average molecular weight are calculated from the measurement results by using a molecular weight calibration curve plotted using a monodisperse polystyrene standard sample.

The polyester resin is obtained by a well-known production method. Specifically, for example, the polyester resin is obtained by a method of reacting reactants at the polymerization temperature adjusted to fall within the range of 180° C. or more and 230° C. or less, and if necessary, under reduced pressure in the reaction system, while removing water or alcohol generated during condensation.

Note that when the monomers of raw materials are not dissolved or compatible at the reaction temperature, the monomers may be dissolved by adding a solvent having a high boiling point as a solubilizing agent. In this case, the polycondensation reaction is carried out while distilling off the solubilizing agent. When a monomer having poor compatibility is present, it is preferable that the poorly compatible monomer be condensed in advance with an acid or an alcohol to be polycondensed with the poorly compatible monomer, and then the condensed product be polycondensed with the main component.

Note that a hybrid resin having a polyester resin segment and a styrene-acrylic copolymer segment may be applied as the polyester resin.

The content of the binder resin is, for example, preferably 40 mass % or more and 95 mass % or less, more preferably 50 mass % or more and 90 mass % or less, still more preferably 60 mass % or more and 85 mass % or less, per the entire toner particles.

Colorant

Examples of the colorant include various pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, Dupont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One of the colorants may be used alone, or two or more of these may be used in combination.

As the colorant, if necessary, a surface-treated colorant may be used, and the colorant may be used in combination with a dispersant. In addition, a plurality of colorants may be used in combination.

The content of the colorant is, for example, preferably 1 mass % or more and 30 mass % or less, more preferably 3 mass % or more and 15 mass % or less, per the entire toner particles.

Release Agent

Examples of the release agent include hydrocarbon-based waxes; natural waxes such as carnauba wax, rice wax, and candelilla wax; synthetic or mineral/petroleum waxes such as montan wax; and ester-based waxes such as a fatty acid ester and a montanic acid ester. The release agent is not limited thereto.

The melting temperature of the release agent is preferably 50° C. or more and 110° C. or less, more preferably 60° C. or more and 100° C. or less.

Note that the melting point is determined from a differential scanning calorimetry (DSC) curve obtained by DSC, conforming to the "melting peak temperature" described in the method of determining a melting point in JIS K 7121-1987 "Testing Methods for Transition Temperatures of Plastics".

The content of the release agent is, for example, preferably 1 mass % or more and 20 mass % or less, more preferably 5 mass % or more and 15 mass % or less, per the entire toner particles.

Internal Additive Resin Particles

Examples of the internal additive resin particles include internal additive resin particles of: polyolefin-based resins (such as polyethylene and polypropylene), styrene-based resins (such as polystyrene and α-polymethylstyrene), (meth)acryl-based resins (such as polymethyl methacrylate and polyacrylonitrile), epoxy resins, polyurethane resins, polyurea resins, polyamide resins, polycarbonate resins, polyether resins, polyester resins, and copolymer resins thereof.

Preferred internal additive resin particles are styrene-(meth)acrylic copolymer resin particles. The internal additive resin particles may be crosslinked resin particles.

The content of the internal additive resin particles is preferably 1 mass % or more and 30 mass % or less, more preferably 3 mass % or more and 25 mass % or less, still more preferably 5 mass % or more and 20 mass % or less, per the toner particles.

Other Additives

Examples of other additives include well-known additives such as a magnetic material, a charge control agent, and inorganic powder. These additives are contained in the toner particles as internal additives.

Properties or the Like of Toner Particles

The toner particles may be toner particles having a single-layer structure, or may be toner particles having a so-called core-shell structure including a core (core particle) and a coating layer (shell layer) with which the core is coated.

Here, the toner particles having the core-shell structure preferably includes, for example, a core containing a binder resin and, if necessary, other additives such as a colorant and a release agent, and a coating layer containing a binder resin.

The volume-average particle diameter (D50v) of the toner particles is preferably 2 μm or more and 10 μm or less, more preferably 4 μm or more and 8 μm or less.

Average particle diameters and particle size distribution indices of the toner particles are measured using a Coulter Multisizer II (manufactured by Beckman Coulter, Inc.) and ISOTON-II (manufactured by Beckman Coulter, Inc.) as a liquid electrolyte.

In the measurement, 0.5 mg or more and 50 mg or less of a sample to be measured is added to 2 ml of a 5% aqueous solution of a surfactant (preferably, sodium alkylbenzene sulfonate) as a dispersant. This is added to the 100 ml or more and 150 ml or less of the liquid electrolyte.

The liquid electrolyte in which the sample is suspended is subjected to a dispersion treatment for one minute by an ultrasonic disperser, and the particle size distribution of particles having a particle diameter in the range of 2 μm or more 60 μm or less is measured by Coulter Multisizer II using an aperture having an aperture diameter of 100 μm. The number of particles to be sampled is 50000.

Volume/number cumulative distributions are drawn from the smaller diameter side based on particle size ranges (channels) divided based on the measured particle size distribution. Particle diameters at cumulative 16% are respectively defined as the volume particle diameter D16v and the number particle diameter D16p, particle diameters at cumulative 50% are respectively defined as volume-average particle diameter D50v and cumulative number-average particle diameter D50p, and particle diameters at cumulative 84% are respectively defined as volume particle diameter D84v and number particle diameter D84p.

The volume particle size distribution index (GSDv) is calculated as $(D84v/D16v)^{1/2}$ and the number particle size distribution index (GSDp) is calculated as $(D84p/D16p)^{1/2}$.

The average circularity of the toner particles is preferably 0.90 or more and 1.00 or less, more preferably 0.92 or more and 0.98 or less.

The average circularity of the toner particles is determined by (Equivalent circle perimeter)/(Perimeter), or (Perimeter of circle having the same projected area as particle image)/(Perimeter of projected image of particle). Specifically, the average circularity of the toner particles is a value measured by the following method.

First, toner particles to be measured are collected by suction and a flat flow is formed. Then, a particle image is captured as a still image by instantaneously emitting strobe light. The average circularity is determined by using a flow-type particle image analyzer (FPIA-3000, manufactured by SYSMEX CORPORATION) capable of performing image analysis of the particle image. The number of samples for obtaining the average circularity is 3500. When the toner contains an external additive, the toner (developer) to be measured is dispersed in water containing a surfactant, then an ultrasonic treatment is performed, and toner particles from which the external additive has been removed is obtained.

External Additive

An applicable external additive is metal titanate particles.

Examples of metal titanate particles include calcium titanate particles, strontium titanate particles, and barium titanate particles.

Among these examples, strontium titanate particles are preferable from the viewpoint of having a good cleaning performance and inhibiting the generation of color streaks.

Metal titanate particles (specifically, strontium titanate particles) are preferably doped with a metal element other than an element forming the main structure, such as titanium and a metal element in the metal salt structure (i.e., a dopant).

Metal titanate particles (specifically, strontium titanate particles) containing a dopant have a lowered crystallinity of the perovskite structure and a rounded shape. This makes it possible to control the average circularity and improve the cleaning performance, and thus, color streaks are less likely to be generated.

The dopant of metal titanate particles (specifically, strontium titanate particles) is preferably a metal element having an ionic radius with which an ion can enter the crystal structure constituting metal titanate particles when the dopant is ionized. From this viewpoint, the dopant of metal titanate particles is preferably a metal element having an ionic radius of 35 μm or more and 200 μm or less, more preferably a metal element having an ionic radius of 40 μm or more and 150 μm or less, when the dopant is ionized.

Specific examples of the dopant of metal titanate particles (specifically, strontium titanate particles) include, lanthanoids, silica (silicon), aluminum, magnesium, calcium, barium, phosphorus, sulfur, vanadium, chromium, manganese, iron, cobalt, nickel, copper, gallium, yttrium, zinc, niobium, molybdenum, ruthenium, rhodium, palladium, silver, indium, tin, antimony, tantalum, tungsten, rhenium, osmium, iridium, platinum, and bismuth. Preferred lanthanoid is lanthanum or cerium.

Among these examples, a preferred dopant of metal titanate particles (specifically, strontium titanate particles) is silica or lanthanum from the viewpoint of having a good cleaning performance and inhibiting the generation of color streaks.

From the viewpoint of having a rounded shape while having a perovskite-type crystal structure, the amount of the dopant of metal titanate particles is preferably in the range of 0.1 mol % or more and 20 mol % or less, more preferably in the range of 0.1 mol % or more and 15 mol % or less, still more preferably in the range of 0.1 mol % or more and 10 mol % or less, per metal elements in the metal salt structure.

Metal titanate particles may be particles obtained by hydrophobizing the surfaces of metal titanate particles.

The surface treatment of metal titanate particles is performed by, for example, preparing a treatment liquid by mixing a solvent and a silicon-containing organic compound as a hydrophobizing agent, mixing metal titanate particles and the treatment liquid while stirring, and further continuing to stir the treatment liquid. After the surface treatment, drying is performed for the purpose of removing the solvent of the treatment liquid.

Examples of the silicon-containing organic compound used for the surface treatment of metal titanate particles include alkoxysilane compounds, silazane compounds, and silicone oils. Among these examples, an alkoxysilane compound is preferable as the silicon-containing organic compound.

Examples of the alkoxysilane compound include tetramethoxysilane and tetraethoxysilane; methyltrimethoxysilane, ethyltrimethoxysilane, propyltrimethoxysilane, n-butyltrimethoxysilane, i-butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, and benzyltriethoxysilane; dimethyldimethoxysilane, dimethyldiethoxysilane, methylvinyldimethoxysilane, methylvinyldiethoxysilane, diphenyldimethoxysilane, and diphenyldiethoxysilane; and trimethylmethoxysilane and trimethylethoxysilane.

Examples of the silazane compound include dimethyldisilazane, trimethyldisilazane, tetramethyldisilazane, pentamethyldisilazane, and hexamethyldisilazane.

Examples of the silicone oil include silicone oils such as dimethylpolysiloxane, diphenylpolysiloxane, and phenylmethylpolysiloxane; and reactive silicone oils such as amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, and phenol-modified polysiloxane.

The amount of the silicon-containing organic compound used for the surface treatment is preferably 1 part by mass or more and 50 parts by mass or less, more preferably 5 parts by mass or more and 40 parts by mass or less, still more preferably 5 parts by mass or more and 30 parts by mass or less per 100 parts by mass of metal titanate particles.

The external addition amount of metal titanate particles is preferably 0.01 mass % or more and 5 mass % or less, more preferably 0.01 mass % or more and 2.0 mass % or less with respect to the toner particles.

Here, a well-known method can be adopted as a method of producing metal titanate particles. As an example, a method of producing strontium titanate particles will be described.

Strontium titanate particles are produced by, for example, adding an alkaline aqueous solution to a liquid mixture of a titanium oxide source and a strontium source, reacting them and promoting granulation, and then performing an acid treatment. Thereafter, if necessary, strontium titanate particles are hydrophobized.

In this production method, the particle diameter of a titanium compound is controlled by the mixing ratio of the titanium oxide source and the strontium source, the concentration of the titanium oxide source at the initial stage of the reaction, the temperature and the addition rate at the time of adding the alkaline aqueous solution, and the like.

Granulation Step

In the method of producing strontium titanate particles, the mixing ratio of the titanium oxide source and the strontium source is preferably 0.9 or more and 1.4 or less, more preferably 1.05 or more and 1.20 or less in terms of the $SrO/TiO_2$ molar ratio. The concentration of the titanium oxide source as $TiO_2$ in the initial stage of the reaction is preferably 0.05 mol/L or more and 1.3 mol/L or less, more preferably 0.5 mol/L or more and 1.0 mol/L or less.

When the dopant source is added to the liquid mixture of the titanium oxide source and the strontium source, a metal oxide is applied as the dopant source.

The metal oxide as the dopant source is added in the form of a solution dissolved in, for example, nitric acid, hydrochloric acid, or sulfuric acid, to the liquid mixture. The amount of the dopant source to be added is preferably such an amount that metal as a dopant is 0.1 mol or more and 10 mol or less, more preferably such an amount that metal as a dopant is 0.5 mol or more and 10 mol or less, per 100 mol of strontium.

The dopant source may be added when the alkaline aqueous solution is added to the liquid mixture of the titanium oxide source and the strontium source. In this case as well, the metal oxide as the dopant source may be added in the form of a solution dissolved in nitric acid, hydrochloric acid, or sulfuric acid.

Preferred alkaline aqueous solution is a sodium hydroxide aqueous solution. As the temperature at the time of adding the alkaline aqueous solution is higher, strontium titanate particles having better crystallinity tend to be obtained. In the present exemplary embodiment, the temperature is preferably in the range of 60° C. or more and 100° C. or less.

With regard to the addition rate of the alkaline aqueous solution, a slower addition rate can provide a larger particle diameter of strontium titanate particles, and a faster addition rate can provide a smaller particle diameter of strontium titanate particles. The addition rate of the alkaline aqueous solution is, for example, 0.001 equivalents/h or more and 1.2 equivalents/h or less, appropriately 0.002 equivalents/h or more and 1.1 equivalents/h or less, with respect to the charged raw material.

Acidization Step

After the alkaline aqueous solution is added, acidization is performed for the purpose of removing an unreacted strontium source. In acidization, for example, the pH of the reaction liquid is adjusted to fall within a range of from 2.5 to 7.0, preferably from 4.5 to 6.0, by using hydrochloric acid.

After acidization, the reaction liquid is subjected to solid-liquid separation, the solid content is dried, and strontium titanate particles are obtained.

Hydrophobization

The hydrophobization on the surface of strontium titanate particles is performed, for example, by preparing a treatment liquid obtained by mixing a hydrophobizing agent and a solvent, mixing strontium titanate particles and the treatment liquid while stirring, and further continuing to stir the treatment liquid.

After the surface treatment, drying is performed for the purpose of removing the solvent of the treatment liquid.

Examples of the hydrophobizing agent include those described above.

Preferred examples of the solvent used for preparing the treatment liquid include alcohols (e.g., methanol, ethanol, propanol, and butanol) and hydrocarbons (e.g., benzene, toluene, normal hexane, and normal heptane).

In the treatment liquid, the concentration of the hydrophobizing agent is preferably 1 mass % or more and 50 mass % or less, more preferably 5 mass % or more and 40 mass % or less, still more preferably 10 mass % or more and 30 mass % or less. Here, in the case of producing strontium titanate particles that exhibit the particle size distribution in the recovered toner satisfies Expression (1), for example, after the production of strontium titanate, moisture is removed by a filter press, suction filtration, or the like, and then hot air drying is performed at a temperature of 80° C. for two hours.

Examples of the external additive other than metal titanate particles include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO $SiO_2$, $K_2O\cdot(TiO_2)_n$, and $Al_2O_3\cdot 2SiO_2$, $CaCO_3$, $MgCO_3$, $BaSO_4$, $MgSO_4$.

The surfaces of the inorganic particles as other external additives are preferably hydrophobized. Hydrophobization is performed by, for example, immersing the inorganic particles in a hydrophobizing agent. The hydrophobizing agent is not particularly limited, and examples thereof include silane coupling agents, silicone oils, titanate coupling agents, and aluminum coupling agents. One of these hydrophobizing agents may be used alone, or two or more of these may be used in combination.

The amount of the hydrophobizing agent is usually, for example, 1 part by mass or more and 10 parts by mass or less per 100 parts by mass of the inorganic particles.

Examples of other external additives also include resin particles such as polystyrene, polymethyl methacrylate (PMMA), and melamine resin; and cleaning activators such as particles of metal salts of higher fatty acids represented by zinc stearate, and of fluorine-based polymer.

The external addition amount of the other external additive is, for example, preferably from 0.01 mass % or more and 10 mass % or less, more preferably from 0.01 mass % or more and 6.0 mass % or less with respect to the toner particles.

Method of Producing Toner

Next, a method of producing the toner according to the present exemplary embodiment will be described.

The toner according to the present exemplary embodiment is obtained by producing toner particles and then externally adding an external additive to the toner particles.

Toner particles may be produced by any of dry production methods (e.g., a kneading and pulverizing method) or wet manufacturing methods (e.g., an aggregation and coalescence method, a suspension polymerization method, and a dissolution suspension method). The production method of toner particles is not particularly limited to these methods, and a well-known method is adopted.

Among these methods, toner particles are preferably obtained by the aggregation and coalescence method.

Specifically, for example, when toner particles are produced by an aggregation and coalescence method, toner particles are produced through:

- a step of mixing a first resin particle dispersion liquid in which first resin particles serving as a binder resin are dispersed, a colorant dispersion liquid in which a colorant is dispersed, and a release agent particle dispersion liquid in which particles of a release agent (hereinafter, such a particle is also referred to as a "release agent particle") are dispersed, and aggregating the particles and the colorant in the obtained dispersion liquid, and forming first aggregated particles (first aggregated particle forming step);
- a step of adding, after obtaining a first aggregated particle dispersion liquid in which the first aggregated particles are dispersed, second resin particles serving as a binder resin to the first aggregated particle dispersion liquid and aggregating the second resin particles on the surface of the first aggregated particle, and forming second aggregated particles (second aggregated particle forming step); and
- a step of heating a second aggregated particle dispersion liquid in which the second aggregated particles are dispersed, fusing and coalescing the second aggregated particles, and forming toner particles (fusion and coalescence step).

This aggregation and coalescence method will be described as a method of producing toner particles containing a binder resin, a colorant, and a release agent. Note that the colorant and the release agent are components included in toner particles, if necessary.

Hereinafter, each step will be described in detail.

Dispersion Liquids Preparation Step

First, dispersion liquids used in the aggregation and coalescence method is prepared. Specifically, a first resin particle dispersion liquid in which first resin particles serving as a binder resin are dispersed, a colorant dispersion liquid in which a colorant is dispersed, a second resin particle dispersion liquid in which second resin particles serving as a binder resin are dispersed, and a release agent particle dispersion liquid in which release agent particles are dispersed are prepared.

In the dispersion liquids preparation step, the first resin particle and the second resin particle are collectively referred to as a "resin particle".

Here, the resin particle dispersion liquid is prepared by, for example, dispersing the resin particles in a dispersion medium using a surfactant.

Examples of the dispersion medium used in the resin particle dispersion liquid include an aqueous medium.

Examples of the aqueous medium include waters such as distilled water and ion-exchanged water; and alcohols. One of these aqueous media may be used alone, or two or more of these may be used in combination.

Examples of the surfactants include anionic surfactants such as a sulfate-based anionic surfactant, a sulfonate-based anionic surfactant, and a phosphate-based anionic surfactant, and a soap-based anionic surfactant; cationic surfactants such as an amine salt-based cationic surfactant and a quaternary ammonium salt type cationic surfactant; and nonionic surfactants such as a polyethylene glycol-based nonionic surfactant, an alkylphenol ethylene oxide adduct-based nonionic surfactant, and a polyhydric alcohol-based nonionic surfactant. Among these examples, particularly preferred surfactants are anionic surfactants and cationic surfactants. The nonionic surfactant may be used in combination with an anionic surfactant or a cationic surfactant.

One of the surfactants may be used alone, or two or more of these may be used in combination.

With regard to the resin particle dispersion liquid, examples of a method of dispersing resin particles in a dispersion medium include general dispersion methods using a rotary shear-type homogenizer; or a ball mill, a sand mill, or a dyno-mill including media. In addition, depending on the type of resin particles, resin particles may be dispersed in a resin particle dispersion liquid using, for example, a phase inversion emulsification method.

Note that the phase inversion emulsification method is as follows. A resin to be dispersed is dissolved in a hydrophobic organic solvent in which the resin is soluble, and a base is added to an organic continuous phase (O phase) to cause neutralization. Then, by charging an aqueous medium (W phase), the resin is converted from W/O to O/W (so-called phase inversion) and a discontinuous phase is formed, thereby dispersing the resin in the form of particles in the aqueous medium.

The volume-average particle diameter of the resin particles dispersed in the resin particle dispersion liquid is, for example, preferably 0.01 μm or more and 1 μm or less, more preferably 0.08 μm or more and 0.8 μm or less, still more preferably 0.1 μm or more and 0.6 μm or less.

The volume-average particle diameter of the resin particles is measured by using a particle size distribution obtained by measurement with a laser diffraction particle size distribution analyzer (e.g., LA-700, manufactured by HORIBA, Ltd.), drawing a cumulative distribution curve of the volume based on divided particle size ranges (channels) from the smaller particle diameter side, and measuring a particle diameter at cumulative 50% with respect to all particles as a volume-average particle diameter D50v. The volume-average particle diameter of particles in other dispersion liquids is also measured in the same manner.

The content of the resin particles contained in the resin particle dispersion liquid is, for example, preferably 5 mass % or more and 50 mass % or less, more preferably from 10 mass % or more and 40 mass % or less.

In the same manner as the resin particle dispersion liquid, for example, a colorant dispersion liquid and a release agent particle dispersion liquid are also prepared. That is, with regard to the volume-average particle diameter, the dispersion medium, the dispersion method, and the content of particles in the resin particle dispersion liquid, the same applies to those of the colorant dispersed in the colorant dispersion liquid and the release agent particles dispersed in the release agent particle dispersion liquid.

First Aggregated Particle Forming Step

Next, the first resin particle dispersion liquid, the colorant dispersion liquid, and the release agent particle dispersion liquid are mixed.

In the mixed dispersion liquid, the first resin particles, the colorant, and the release agent particles are heteroaggregated, and first aggregated particles containing the first resin particles, the colorant, and the release agent particles are formed.

Specifically, for example, an aggregating agent is added to the dispersion liquid obtained by mixing the first resin particle dispersion liquid, the colorant dispersion liquid, and the release agent particle dispersion liquid, the pH of the mixed dispersion liquid is adjusted to be acidic (e.g., pH of 2 or more and 5 or less), and a dispersion stabilizer is added, if necessary. Then, the temperature is adjusted to fall within the temperature range of 20° C. or more and 50° C. or less, and particles dispersed in the mixed dispersion liquid are aggregated. In this way, the first aggregated particles are formed.

In the first aggregated particle forming step, for example, the above-described heating may be performed after all the processes of: adding the above-described aggregating agent to the mixed dispersion liquid at room temperature (e.g., 25° C.) while stirring the mixed dispersion liquid by using a rotary shear-type homogenizer; adjusting the pH of the mixed dispersion liquid to be acidic (e.g., pH of 2 or more and 5 or less); and adding a dispersion stabilizer, if necessary.

Examples of the aggregating agent include surfactants having a polarity opposite to that of the surfactant used as the dispersant added to the mixed dispersion liquid; inorganic metal salts; and divalent or higher metal complexes. In particular, when a metal complex is used as the aggregating agent, the amount of surfactant used is reduced, and the charging properties are improved.

An additive that forms a complex or a similar bond with a metal ion of the aggregating agent may be used, if necessary. A suitably used additive is a chelating agent.

Examples of the inorganic metal salt include metal salts such as calcium chloride, calcium nitrate, barium chloride, magnesium chloride, zinc chloride, aluminum chloride, and aluminum sulphate; and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, iminodiacetic acid (IDA), nitrilotriacetic acid (NTA), and ethylenediamine tetraacetic acid (EDTA).

The amount of the chelating agent added is, for example, preferably 0.01 parts by mass or more and 5.0 parts by mass or less, more preferably 0.1 parts by mass or more and less than 3.0 parts by mass, per 100 parts by mass of the first resin particles.

Second Aggregated Particle Forming Step

Next, after obtaining the first aggregated particle dispersion liquid in which the first aggregated particles are dispersed, the second resin particle dispersion liquid in which the second resin particles are dispersed is added to the first aggregated particle dispersion liquid.

Note that the second resin particles may be the same as or different from the first resin particles.

Then, in the dispersion liquid of the first aggregated particles and the second resin particles, the second resin particles are aggregated on the surfaces of the first aggregated particles. At this time, the second resin particles and the release agent particles may be aggregated on the surfaces of the first aggregated particles by adding a release agent particle dispersion liquid. Specifically, for example, in the first aggregated particle forming step, when the first aggregated particles reach a target particle diameter, the second resin particle dispersion liquid is added to the first aggregated particle dispersion liquid, and heating is performed at a temperature that is the glass transition temperature or less of the second resin particles.

Then, the progress of the aggregation is stopped by adjusting the pH of the dispersion liquid to fall within the range of, for example, about 6.5 or more and about 8.5 or less.

In this manner, the second aggregated particles in which the second resin particles are aggregated so as to be adhered to the surface of the first aggregated particle are obtained.

Fusion and Coalescence Step

Next, the second aggregated particle dispersion liquid in which the second aggregated particles are dispersed is heated to, for example, a temperature that is the glass transition temperatures or higher of the first and second resin particles (e.g., a temperature higher than the glass transition temperatures of the first and second resin particles by a temperature from 10 to 30° C.), and the second aggregated particles are fused and coalesced. In this way, toner particles are formed.

Through the above steps, toner particles are obtained.

Note that, in the aggregation and coalescence method described above, toner particles may be formed by fusing and coalescing the first aggregated particles without performing the second aggregated particle forming step. The second aggregated particle forming step may be performed multiple times.

Here, after the completion of the fusion and coalescence step, the toner particles formed in the solution undergo a known washing step, solid-liquid separation step, and drying step, and dried toner particles are obtained.

In the washing step, sufficient displacement washing with ion-exchanged water is preferably performed from the viewpoint of chargeability. In addition, the solid-liquid separation step is not particularly limited, but suction filtration, pressure filtration, or the like may be performed from the viewpoint of productivity. The drying step is not particularly limited, but freeze drying, flash drying, fluidized drying, vibratory fluidized drying, or the like may be performed from the viewpoint of productivity.

The toner according to the present exemplary embodiment is produced, for example, by adding and mixing an external additive to the obtained dried toner particles. The mixing may be performed by using, for example, a V blender, a Henschel mixer, or a Lodige mixer. Further, if necessary, coarse particles of the toner may be removed by using a vibratory sieving machine, a wind power sieving machine, or the like.

Carrier

The carrier is not particularly limited, and examples thereof include known carriers. Examples of the carrier include coated carriers in which the surface of a core material including magnetic powder is coated with a coating resin; magnetic powder-dispersed carriers in which magnetic powder is dispersed and blended in a matrix resin; and resin-impregnated carriers in which porous magnetic powder is impregnated with a resin.

Note that the magnetic powder-dispersed carrier and the resin-impregnated carrier may be a carrier in which the constituent particle of the carrier is used as a core material, and the core material is coated with a coating resin.

Examples of the magnetic powder include powder of magnetic metals such as iron, nickel, and cobalt; and powder of magnetic oxides such as ferrite and magnetite.

Examples of the coating resin and the matrix resin include styrene-(meth)acrylic acid resins; polyolefin-based resins such as polyethylene resin and polypropylene resin; polyvinyl-based or polyvinylidene-based resins such as polystyrene, (meth)acrylic resin, polyacrylonitrile, polyvinyl acetate, polyvinyl alcohol, polyvinyl butyral, polyvinyl chloride, polyvinyl carbazole, polyvinyl ether, and polyvinyl ketone; vinyl chloride-vinyl acetate copolymers; straight silicone resins having a organosiloxane bond or modified products thereof, fluororesins such as polytetrafluoroethylene, polyvinyl fluoride, polyvinylidene fluoride, and polychlorotrifluoroethylene; polyesters; polyurethanes; polycarbonates; amino resins such as urea-formaldehyde resin; and epoxy resin.

The coating resin and the matrix resin preferably contain a (meth)acrylic resin, more preferably contain a (meth) acrylic resin in an amount of 50 mass % or more with respect to the total mass of the resin, still more preferably contain a (meth)acrylic resin in an amount of 80 mass % or more with respect to the total mass of the resin.

In particular, the coating resin and the matrix resin preferably contain an alicyclic (meth)acrylic resin as the (meth) acrylic resin.

Note that the coating resin and the matrix resin may contain other additives such as conductive particles.

Examples of the conductive particles include particles of metals such as gold, silver, and copper; carbon black; titanium oxide; zinc oxide; tin oxide; barium sulfate; aluminum borate; and potassium titanate.

Here, examples of method of coating the surface of the core material with the coating resin include methods of coating the surface of the core material with a coating layer forming solution in which the coating resin and, if necessary, various additives are dissolved in an appropriate solvent. The solvent is not particularly limited. It is sufficient that the solvent be selected in consideration of the coating resin to be used, coating suitability, and the like. Specific examples of the resin coating method include immersion methods of immersing the core material in the coating layer forming solution, a spray method of spraying the coating layer forming solution onto the surface of the core material, a fluidized bed method of spraying the coating layer forming solution while floating the core material by flowing air, and a kneader coater method of mixing the core material of the carrier and the coating layer forming solution in a kneader coater and removing the solvent.

The mixing ratio (mass ratio) between the toner and the carrier in the two-component developer is preferably satisfying toner:carrier=1:100 to 30:100, more preferably 3:100 to 20:100.

EXAMPLES

Hereinafter, examples of the present disclosure will be described, but the present disclosure is not limited to the following examples. Note that, in the following description, "part(s)" and "%" are all based on mass unless otherwise specified.

Production of Carrier

Cyclohexyl methacrylate resin (weight-average molecular weight of 50000): 54 parts Carbon black (VXC72, manufactured by Cabot Corporation): 6 parts Toluene: 250 parts Isopropyl alcohol: 50 parts The above-described materials and glass beads (diameter: 1 mm, the same amount as toluene) are charged into a sand mill and stirred at a rotation speed of 190 rpm for 30 minutes, and a coating agent is obtained.

Into a kneader, 1000 parts of ferrite particles (volume-average particle diameter: 35 m) and 150 parts of the coating agent are charged, and both are mixed at room temperature (25° C.) for 20 minutes. Then, the mixture is dried by heating to 70° C. under reduced pressure. The dried product is cooled to room temperature (25° C.), taken out from the kneader, and sieved by using a mesh having an opening of 75 μm, and coarse powder is removed, thereby obtaining a carrier.

Preparation of Particle Dispersion Liquid

Preparation of Amorphous Resin Particle Dispersion Liquid (1-1)

Terephthalic acid: 28 parts

Fumaric acid: 164 parts

Adipic acid: 10 parts

Bisphenol A ethylene oxide (2 mol) adduct: 26 parts

Bisphenol A propylene oxide (2 mol) adduct: 542 parts

The above-described materials are charged into a reaction vessel equipped with a stirrer, a nitrogen inlet tube, a temperature sensor, and a rectifying column, the temperature is raised to 190° C. over one hour, and 1.2 parts of dibutyltin oxide are charged thereinto per 100 parts of the above-described materials. The temperature is raised to 240° C. over six hours while distilling off the generated water, and the dehydration condensation reaction is continued for three hours while maintaining 240° C., thereafter the reaction product is cooled.

The reaction product is transferred to Cavitron CD1010 (manufactured by EUROTEC LIMITED) at a rate of 100 g per minute while maintaining a molten state. At the same time, separately prepared ammonium water having a concentration of 0.37% is transferred to the Cavitron CD1010 at a rate of 0.1 L per minute while being heated to 120° C. by a heat exchanger. The Cavitron CD1010 is operated at a rotor rotation speed of 60 Hz under a pressure of 5 kg/cm$^2$, and a resin particle dispersion liquid in which amorphous polyester resin particles having a volume-average particle diameter of 169 nm are dispersed is obtained. The solid content is adjusted to 20% by adding ion-exchanged water to the resin particle dispersion liquid. The obtained dispersion liquid is defined as an amorphous resin particle dispersion liquid (1-1). The SP value (R) of the amorphous polyester resin is 9.41.

Preparation of Crystalline Resin Particle Dispersion Liquid (1-2)

1,10-dodecanedioic acid: 225 parts 1,6-hexanediol: 143 parts

The above-described materials are charged into a reaction vessel equipped with a stirrer, a nitrogen inlet tube, a temperature sensor, and a rectifying column, the temperature is raised to 160° C. over one hour, and 0.8 parts of dibutyltin oxide are charged thereinto. The temperature is raised to 180° C. over six hours while distilling off the generated water, and the dehydration condensation reaction is continued for five hours while maintaining 180° C. Then, the temperature is gradually raised to 230° C. under reduced pressure, and the mixture is stirred for two hours while maintaining the temperature at 230° C. Subsequently, the reaction product is cooled and subjected to solid-liquid separation, and the solid matter is dried. In this way, a crystalline polyester resin is obtained.

Crystalline polyester resin: 100 parts

Methyl ethyl ketone: 40 parts

Isopropyl alcohol: 30 parts

10% ammonia aqueous solution: 6 parts

The above-described materials are charged into a jacketed reaction vessel equipped with a condenser, a thermometer, a water-dropping device, and an anchor impeller, and the resins are dissolved by stirring and mixing the materials at a 100 rpm while maintaining the liquid temperature at 80° C. in a water-circulating thermostatic chamber. Then, the water-circulating thermostatic chamber is set to 50° C., 400 parts in total of ion-exchanged water kept at 50° C. is added dropwise at a rate of 7 parts/min., and an emulsion is obtained. An eggplant flask is charged with 576 parts of the emulsion and 500 parts of ion-exchanged water, and the flask is set in an evaporator equipped with a vacuum control unit with a trap ball interposed therebetween. The eggplant flask is heated in a hot water bath at 60° C. while being rotated, the pressure is reduced to 7 kPa while being careful not to cause bumping, and the solvent is removed. The volume-average particle diameter of the resin particles in this dispersion liquid is 185 nm. Ion-exchanged water is added thereto, and a crystalline resin particle dispersion liquid (1-2) having a solid content of 22.1% is obtained.

Preparation of Resin Particle Dispersion Liquid (2)

Styrene: 47.9 parts

N-butyl acrylate: 51.8 parts

2-Carboxyethyl acrylate: 0.3 parts 1,10-decanediol diacrylate: 1.65 parts

Anionic surfactant (DOWFAX 2A1, manufactured by The Dow Chemical Company): 0.8 parts The above-described materials are put in a flask, mixed and dissolved, and 60 parts of ion-exchanged water are further added thereto, followed by dispersion treatment. An emulsion is thus prepared. Then, 1.3 parts of anionic surfactants (DOWFAX 2A1, manufactured by The Dow Chemical Company) is dissolved in 90 parts of ion-exchanged water, 1 part of the emulsion is added thereto, and a solution in which 5.4 parts of ammonium persulfate is dissolved in 10 parts of ion-exchanged water is further added thereto. The remainder of the emulsion is then added over 180 minutes. Subsequently, the flask is purged with nitrogen, and the solution in the flask is heated to the liquid temperature of 65° C. in an oil bath while stirring. While keeping the liquid temperature at 65° C., stirring is continued for 500 minutes, and the solution is emulsion-polymerized. Thereafter, the solid content is adjusted to 24.5% by using ion-exchanged water, and a resin particle dispersion liquid (2) is obtained.

Preparation of Colorant Particle Dispersion Liquid (1)

Cyan pigment (Pigment Blue 15:3, manufactured by Dainichiseika Color & Chemicals Mfg. Co., Ltd.): 98 parts Anionic surfactant (TaycaPower, manufactured by Tayca Corporation): 2 parts Ion-exchanged water: 420 parts The above-described materials are mixed and subjected to a dispersion treatment for 10 minutes by using a homogenizer (IKA ULTRA-TURRAX), and a colorant particle dispersion liquid (1) having a volume-average particle diameter of 164 nm and a solid content of 21.1% is obtained.

Preparation of Release Agent Particle Dispersion Liquid (1)

Synthetic wax (FNP92, manufactured by NIPPON SEIRO CO., LTD.): 50 parts

Anionic surfactant (TaycaPower, manufactured by Tayca Corporation): 1 part

Ion-exchanged water: 200 parts

The above-described materials are mixed, heated to 130° C., and subjected to a dispersion treatment by using a homogenizer (ULTRA-TURRAX T50, manufactured by IKA). Thereafter, the mixture is further subjected to a dispersion treatment by using a pressure discharge homogenizer. When the volume-average particle diameter reaches 200 nm, the dispersion-treated mixture is collected, and a release agent particle dispersion liquid (1) having a solid content of 20% is obtained.

Production of Toner Particles

Production of Toner Particles (1)

Amorphous resin particle dispersion liquid (1-1): 169 parts

Crystalline resin particle dispersion liquid (1-2): 53 parts

Resin particle dispersion liquid (2): 33 parts

Colorant dispersion liquid (1): 33 parts

Release agent dispersion liquid (1): 25 parts

Anionic surfactant (DOWFAX 2A1, manufactured by The Dow Chemical Company): 4.8 parts The above-described materials adjusted to the liquid temperature of 10° C. are put in a cylindrical stainless steel vessel, and subjected to dispersion treatment and mixed for two minutes while applying a shearing force at a 4000 rpm by using a homogenizer (ULTRA-TURRAX T50, manufactured by IKA). Then, 1.75 parts of a 10% nitric acid aqueous solution of aluminum sulfate is gradually added dropwise as an aggregating agent, and the mixture is subjected to a dispersion treatment for 10 minutes at the increased rotation speed of the homogenizer of 10000 rpm. In this way, a raw material dispersion liquid is obtained.

The raw material dispersion liquid is transferred to a reaction vessel equipped with a thermometer and a stirrer having a stirring impeller with two paddles. While stirring at a rotation speed of 550 rpm, the liquid temperature is raised to 40° C. by starting heating using a mantle heater, and the pH of the raw material dispersion liquid is controlled in the range of from 2.2 to 3.5 with 0.3 M nitric acid and 1 M sodium hydroxide aqueous solution, and aggregated particles are grown by keeping the temperature and pH for about two hours. Next, a dispersion liquid in which 21 parts of the amorphous resin particle dispersion liquid (1-1) and 8 parts of the resin particle dispersion liquid (2) are mixed is additionally added thereto and retained for 60 minutes, and the amorphous resin particles and the crosslinked resin particles are adhered to the surface of the aggregated particles. Next, the liquid temperature is raised to 53° C., 21 parts of the amorphous resin particle dispersion liquid (1-1) are added, the dispersion liquid is retained for 60 minutes, and the amorphous resin particles are further adhered to the surface of the aggregated particles.

The aggregated particles are adjusted while checking the size and form of the particles by using an optical microscope and a particle diameter measurement device. The pH is then adjusted to 7.8 using 5% sodium hydroxide aqueous solution, and the dispersion liquid is retained for 15 minutes. Subsequently, the pH is raised to 8.0 using a 5% sodium hydroxide aqueous solution, and the liquid temperature is raised to 85° C. Using an optical microscope, it is confirmed that the aggregated particles are fused, and after two hours, heating is stopped, and the liquid is cooled at a rate of 1.0° C./min. Solid-liquid separation is performed by using a m mesh, water washing is repeated, then the liquid is dried by using a vacuum dryer, and toner particles (1) are obtained. The volume-average particle diameter of the toner particles (1) is 5.3 μm.

Preparation of Metal Titanate Particles

Metal Titanate Particles (T1)

Into a reaction vessel, 0.7 mol of metatitanic acid, which is a desulfurized and peptized titanium source, is collected as $TiO_2$ and put. Then, 0.77 mol of a strontium chloride aqueous solution is added to the reaction vessel so that the $SrO/TiO_2$ molar ratio is 1.1. Subsequently, a solution in which silicon dioxide is dissolved in nitric acid is added to the reaction vessel in such an amount that silicon is 1.0 mol per 100 mol of strontium. The initial $TiO_2$ concentration in the liquid mixture of the three materials is 0.75 mol/L. Thereafter, the liquid mixture is stirred and heated to 90° C., and 153 mL of 10 N (mol/L) sodium hydroxide aqueous solution is added thereto over two hours while stirring and maintaining the liquid temperature at 90° C. Further, the liquid mixture is continued to be stirred for one hour while maintaining the liquid temperature of 90° C. Then, the reaction liquid is cooled to 40° C., and hydrochloric acid is added thereto until the pH reaches 5.5, followed by stirring for one hour. The precipitate is then washed by repeating decantation and redispersion in water. Hydrochloric acid is added to the slurry containing the washed precipitates, and the pH is adjusted to 6.5. Then, the solid content is separated by filtration and dried. To the dried solid content, an ethanol solution of i-butyltrimethoxysilane (i-BTMS) is added in such an amount that i-BTMS is 20 parts per 100 parts of the solid content, and the mixture is stirred for one hour. A solid content is separated by filtration, the solid content is dried with hot air at a temperature of 80° C. for two hours, and metal titanate particles (T1) are obtained.

Metal Titanate Particles (T2)

Metal titanate particles (T2) are obtained in the same manner as the metal titanate particles (T1) except that the solution in which silicon dioxide is dissolved in nitric acid is changed to a solution in which lanthanum oxide is dissolved in nitric acid.

Metal Titanate Particles (T3)

Metal titanate particles (T3) are obtained in the same manner as the metal titanate particles (T1) except that the liquid temperature at the time of adding the sodium hydroxide aqueous solution is changed to 96° C.

Metal Titanate Particles (T4)

Metal titanate particles (T4) are obtained in the same manner as the metal titanate particles (T1) except that the liquid temperature at the time of adding the sodium hydroxide aqueous solution is changed to 94° C.

Metal Titanate Particles (T5)

Metal titanate particles (T5) are obtained in the same manner as the metal titanate particles (T1) except that the liquid temperature at the time of adding the sodium hydroxide aqueous solution is changed to 88° C.

Metal Titanate Particles (T6)

Metal titanate particles (T6) are obtained in the same manner as the metal titanate particles (T1) except that the liquid temperature at the time of adding the sodium hydroxide aqueous solution is changed to 86° C.

Metal Titanate Particles (T7)

Metal titanate particles (T7) are obtained in the same manner as the metal titanate particles (T1) except that the temperature and the drying time of hot air drying are changed to 60° C. and three hours, respectively.

Metal Titanate Particles (T8)

Metal titanate particles (T8) are obtained in the same manner as the metal titanate particles (T1) except that the temperature of hot air drying is changed to 60° C.

Metal Titanate Particles (T9)

Metal titanate particles (T9) are obtained in the same manner as the metal titanate particles (T1) except that the temperature of hot air drying is changed to 70° C.

Metal Titanate Particles (T10)

Metal titanate particles (T10) are obtained in the same manner as the metal titanate particles (T1) except that the temperature of hot air drying is changed to 100° C.

Metal Titanate Particles (T11)

Metal titanate particles (T11) are obtained in the same manner as the metal titanate particles (T1) except that the temperature of hot air drying is changed to 120° C.

Metal Titanate Particles (T12)

Metal titanate particles (T12) are obtained in the same manner as the metal titanate particles (T1) except that the temperature and the drying time of hot air drying are changed to 120° C. and one hour, respectively.

Metal Titanate Particles (T13)

Metal titanate particles (T13) are obtained in the same manner as the metal titanate particles (T1) except that the liquid temperature at the time of adding the sodium hydroxide aqueous solution and the liquid temperature after the addition are changed to 84° C.

Metal Titanate Particles (T14)

Metal titanate particles (T14) are obtained in the same manner as the metal titanate particles (T1) except that the liquid temperature at the time of adding the sodium hydroxide aqueous solution and the liquid temperature after the addition are changed to 84° C. and 88° C., respectively.

Metal Titanate Particles (T15)

Metal titanate particles (T15) are obtained in the same manner as the metal titanate particles (T1) except that the liquid temperature at the time of adding the sodium hydroxide aqueous solution and the liquid temperature after the addition are changed to 88° C.

Metal Titanate Particles (T16)

Metal titanate particles (T16) are obtained in the same manner as the metal titanate particles (T1) except that the liquid temperature at the time of adding the sodium hydroxide aqueous solution and the liquid temperature after the addition are changed to 92° C.

Metal Titanate Particles (T17)

Metal titanate particles (T17) are obtained in the same manner as the metal titanate particles (T1) except that the liquid temperature at the time of adding the sodium hydroxide aqueous solution and the liquid temperature after the addition are changed to 96° C.

Metal Titanate Particles (T18)

Metal titanate particles (T18) are obtained in the same manner as the metal titanate particles (T1) except that the liquid temperature at the time of adding the sodium hydroxide aqueous solution and the liquid temperature after the addition are changed to 96° C. and 98° C., respectively.

Metal Titanate Particles (T19)

Metal titanate particles (T19) are obtained in the same manner as the metal titanate particles (T1) except that the liquid temperature after the addition of the sodium hydroxide aqueous solution and the stirring time are changed to 86° C. and 50 minutes, respectively.

Metal Titanate Particles (T20)

Metal titanate particles (T20) are obtained in the same manner as the metal titanate particles (T1) except that the liquid temperature after the addition of the sodium hydroxide aqueous solution is changed to 86° C.

Metal Titanate Particles (T21)

Metal titanate particles (T21) are obtained in the same manner as the metal titanate particles (T1) except that the liquid temperature after the addition of the sodium hydroxide aqueous solution is changed to 88° C.

Metal Titanate Particles (T22)

Metal titanate particles (T22) are obtained in the same manner as the metal titanate particles (T1) except that the liquid temperature after the addition of the sodium hydroxide aqueous solution is changed to 93° C.

Metal Titanate Particles (T23)

Metal titanate particles (T23) are obtained in the same manner as the metal titanate particles (T1) except that the liquid temperature after the addition of the sodium hydroxide aqueous solution is changed to 95° C.

Metal Titanate Particles (T24)

Metal titanate particles (T24) are obtained in the same manner as the metal titanate particles (T1) except that the liquid temperature after the addition of the sodium hydroxide aqueous solution and the stirring time are changed to 95° C. and 70 minutes, respectively.

Metal Titanate Particles (T25)

Metal titanate particles (T25) are obtained in the same manner as the metal titanate particles (T1) except that the amount of the sodium hydroxide aqueous solution and the time during which the sodium hydroxide aqueous solution is added are changed to 143 ml and five hours, respectively.

Metal Titanate Particles (T26)

Metal titanate particles (T26) are obtained in the same manner as the metal titanate particles (T1) except that the time during which the sodium hydroxide aqueous solution is added is changed to four hours.

Metal Titanate Particles (T27)

Metal titanate particles (T27) are obtained in the same manner as the metal titanate particles (T1) except that the amount of the sodium hydroxide aqueous solution and the liquid temperature after the addition of the sodium hydroxide aqueous solution are changed to 163 ml and 92° C., respectively.

Metal Titanate Particles (T28)

Metal titanate particles (T28) are obtained in the same manner as the metal titanate particles (T1) except that the strontium chloride aqueous solution is changed to the calcium chloride aqueous solution.

Metal Titanate Particles (T29)

Metal titanate particles (T29) are obtained in the same manner as the metal titanate particles (T1) except that the solution in which silicon dioxide is dissolved in nitric acid is not added.

Metal Titanate Particles (T30)

Metal titanate particles (T30) are obtained in the same manner as the metal titanate particles (T1) except that the solution in which silicon dioxide is dissolved in nitric acid is changed to a solution in which niobium oxide is dissolved in nitric acid.

Metal Titanate Particles (T31)

Metal titanate particles (T31) are obtained in the same manner as the metal titanate particles (T1) except that the liquid temperature at the time of adding the sodium hydroxide aqueous solution and the time during which the sodium hydroxide aqueous solution is added are changed to 96° C. and five hours, respectively.

Metal Titanate Particles (T32)

Metal titanate particles (T32) are obtained in the same manner as the metal titanate particles (T1) except that the drying method is changed from hot air drying to the stationary drying in which the drying temperature is 100° C. and the drying time is two hours.

Preparation of Developer (1)

Developer (1)

Toner particles (1): 100 parts

Strontium titanate particles (1): 0.80 parts

The above-described materials are mixed using a Henschel mixer, the mixture is screened using a vibrating sieve having an opening of 45 m, and a toner is obtained. A V blender is charged with 8 parts of the toner and 100 parts of the carrier, and the materials are stirred and screened using a sieve having an opening of 212 m, and a developer (1) is obtained.

Developers (2) to (34) and Developers (C1) to (C2)

Developers (2) to (34) and developers (C1) to (C2) are obtained in the same manner as in the case of the developer (1). Provided, however, that the kind and the external addition amount of the strontium titanate particles are changed as stated in Table 1.

Examples 1 to 34 and Comparative Examples 1 and 2

An image forming device "ApeosPort C7070, manufactured by FUJIFILM Business Innovation Corp." is prepared.

Then, the developing device of the above-described image forming device is filled with each of the prepared developers, and an image forming device for each example is prepared.

Properties

The following properties of metal titanate particles in the recovered toner of the image forming device in each example are measured according to the above-described methods.

In addition, the following properties of metal titanate particles of the toner in the developer contained in the developing device of the image forming device are measured according to the above-described methods. Provided, however, that the following properties of metal titanate particles before metal titanate particles are externally added to the toner (i.e., the following properties of metal titanate particles of the toner in the developer) are also measured.

The width a (unit: μm) on the smaller diameter side from a perpendicular line at the 50% height of the maximum peak height when the perpendicular line is drawn from the maximum peak of the particle size distribution curve of metal titanate particles in the recovered toner.

The width b (unit: μm) on the larger diameter side from a perpendicular line at the 50% height of the maximum peak height when the perpendicular line is drawn from the maximum peak of the particle size distribution curve of metal titanate particles in the recovered toner.

The maximum peak height H (unit: %) of the particle size distribution curve of metal titanate particles in the recovered toner, which represents the frequency of particles having a certain particle diameter with respect to the total number of particles for each particle diameter.

The particle diameter D (unit: μm) at the maximum peak in the particle size distribution curve of metal titanate particles in the recovered toner.

The average circularity AC of metal titanate particles in the recovered toner and in the toner of the developer The number ratio NR (unit: %) of metal titanate particles to the toner particles in the recovered toner.

Note that, with respect to the toner of the developer, the maximum peak particle diameter in the particle size distribution curve of metal titanate particles indicates the maximum peak particle diameter D1 (unit: μm) on the larger diameter side and the maximum peak particle diameter D2 (unit: μm) on the smaller diameter side.

Color Streak Evaluation

The following color streak evaluation is performed using the image forming device of each example.

An operation of copying a halftone image having an image density of 30% on 30000 sheets of A4 paper in a low-temperature and low-humidity environment (temperature: 10° C., relative humidity: 15%) is repeated twice, and then a halftone image having an image density of 5% is copied on 10000 sheets of A4 paper in a high-temperature and high-humidity environment (temperature: 28° C., relative humidity: 85%). The surface of the photoreceptor after copying 10000 sheets is observed with an eye and a microscope, and the image quality of the last 10 sheets is observed with an eye. The contamination of the photoreceptor is classified as follows. The evaluation criteria are as follows.

A+: No adhering substances are observed on the surface of the photoreceptor both with an eye and with a microscope. No color streaks and the like are observed on the paper surface.

A: No adhering substances are observed with an eye on the surface of the photoreceptor. Fine adhering substances are observed on the surface of the photoreceptor with a microscope. No color streaks and the like are observed on the paper surface.

A−: No adhering substances are observed with an eye on the surface of the photoreceptor. Fine adhering substances in streaks are observed on the surface of the photoreceptor with a microscope. No color streaks and the like are observed on the paper surface.

B: Adhering substances are observed with an eye on the surface of the photoreceptor. Adhering substances are observed on the surface of the photoreceptor with a microscope. No color streaks and the like are observed on the paper surface.

C: Streaky adhering substances are observed with an eye on the surface of the photoreceptor. Adhering substances are observed on the surface of the photoreceptor with a microscope. No color streaks and the like are observed on the paper surface.

D: Streaky adhering substances are observed with an eye on the surface of the photoreceptor. Adhering substances are observed on the surface of the photoreceptor with a microscope. Color streaks are observed on the paper surface.

TABLE 1-1

| | | Toner of developer Titanic acid metal salt particles | | | | | | | |
|---|---|---|---|---|---|---|---|---|---|
| | Developer No. — | No. — | Type — | Dopant species — | Amount of dopant added Mass % | Maximum peak particle diameter D1 μm | Maximum peak particle diameter D2 μm | Average circularity AC — | External addition amount Mass % |
| Example 1 | 1 | 1 | Strontium titanate | Si | 0.6 | 0.06 | 1.1 | 0.88 | 0.8 |
| Example 2 | 2 | 2 | Strontium titanate | La | 0.6 | 0.06 | 1.2 | 0.91 | 0.8 |
| Example 3 | 3 | 3 | Strontium titanate | Si | 0.6 | 0.06 | 1.2 | 0.85 | 0.8 |
| Example 4 | 4 | 4 | Strontium titanate | Si | 0.6 | 0.06 | 1.2 | 0.88 | 0.8 |
| Example 5 | 5 | 5 | Strontium titanate | Si | 0.6 | 0.06 | 1.3 | 0.92 | 0.8 |
| Example 6 | 6 | 6 | Strontium titanate | Si | 0.6 | 0.06 | 1.2 | 0.85 | 0.8 |
| Example 7 | 7 | 7 | Strontium titanate | Si | 0.6 | 0.06 | 1.1 | 0.93 | 0.8 |
| Example 8 | 8 | 8 | Strontium titanate | Si | 0.6 | 0.06 | 1.5 | 0.88 | 0.8 |
| Example 9 | 9 | 9 | Strontium titanate | Si | 0.6 | 0.06 | 1.4 | 0.87 | 0.8 |
| Example 10 | 10 | 10 | Strontium titanate | Si | 0.6 | 0.06 | 1.7 | 0.88 | 0.8 |
| Example 11 | 11 | 11 | Strontium titanate | Si | 0.6 | 0.06 | 0.9 | 0.91 | 0.8 |
| Example 12 | 12 | 12 | Strontium titanate | Si | 0.6 | 0.06 | 1.5 | 0.91 | 0.8 |
| Example 13 | 13 | 13 | Strontium titanate | Si | 0.6 | 0.06 | 1.2 | 0.89 | 0.8 |
| Example 14 | 14 | 14 | Strontium titanate | Si | 0.6 | 0.06 | 1.1 | 0.86 | 0.8 |
| Example 15 | 15 | 15 | Strontium titanate | Si | 0.6 | 0.06 | 1.5 | 0.81 | 0.8 |
| Example 16 | 16 | 16 | Strontium titanate | Si | 0.6 | 0.06 | 1.4 | 0.86 | 0.8 |
| Example 17 | 17 | 17 | Strontium titanate | Si | 0.6 | 0.06 | 1.2 | 0.83 | 0.8 |
| Example 18 | 18 | 18 | Strontium titanate | Si | 0.6 | 0.06 | 1.3 | 0.94 | 0.8 |
| Example 19 | 19 | 19 | Strontium titanate | Si | 0.6 | 0.06 | 0.4 | 0.92 | 0.8 |
| Example 20 | 20 | 20 | Strontium titanate | Si | 0.6 | 0.06 | 0.5 | 0.89 | 0.8 |

TABLE 1-1-continued

| | Developer No. — | Toner of developer Titanic acid metal salt particles No. — | Type — | Dopant species — | Amount of dopant added Mass % | Maximum peak particle diameter D1 μm | Maximum peak particle diameter D2 μm | Average circularity AC — | External addition amount Mass % |
|---|---|---|---|---|---|---|---|---|---|
| Example 21 | 21 | 21 | Strontium titanate | Si | 0.6 | 0.06 | 0.75 | 0.88 | 0.8 |
| Example 22 | 22 | 22 | Strontium titanate | Si | 0.6 | 0.06 | 2 | 0.87 | 0.8 |
| Example 23 | 23 | 23 | Strontium titanate | Si | 0.6 | 0.06 | 3 | 0.88 | 0.8 |
| Example 24 | 24 | 24 | Strontium titanate | Si | 0.6 | 0.06 | 3.5 | 0.91 | 0.8 |
| Example 25 | 25 | 25 | Strontium titanate | Si | 0.6 | 0.06 | 1.5 | 0.7 | 0.8 |
| Example 26 | 26 | 26 | Strontium titanate | Si | 0.6 | 0.06 | 1.7 | 0.76 | 0.8 |
| Example 27 | 27 | 27 | Strontium titanate | Si | 0.6 | 0.06 | 1.4 | 0.99 | 0.8 |
| Example 28 | 28 | 1 | Strontium titanate | Si | 0.6 | 0.06 | 1.1 | 0.88 | 0.1 |
| Example 29 | 29 | 1 | Strontium titanate | Si | 0.6 | 0.06 | 1.1 | 0.88 | 0.2 |
| Example 30 | 30 | 1 | Strontium titanate | Si | 0.6 | 0.06 | 1.1 | 0.88 | 2.1 |
| Example 31 | 31 | 1 | Strontium titanate | Si | 0.6 | 0.06 | 1.1 | 0.88 | 2.4 |
| Example 32 | 32 | 28 | Calcium titanate | Si | 0.6 | 0.06 | 1.5 | 0.92 | 0.8 |
| Example 33 | 33 | 29 | Strontium titanate | Undoped | — | 0.06 | 1.7 | 0.89 | 0.8 |
| Example 34 | 34 | 30 | Strontium titanate | Nb | 0.6 | 0.06 | 0.9 | 0.91 | 0.8 |
| Comparative Example 1 | C1 | 31 | Strontium titanate | Si | 0.6 | 0.06 | 1.3 | 0.95 | 0.8 |
| Comparative Example 2 | C2 | 32 | Strontium titanate | Si | 0.6 | 0.06 | 1.1 | 0.88 | 0.8 |

TABLE 1-2

| | Collected toner Titanic acid metal salt particles — Particle size distribution curve | | | | | | | |
|---|---|---|---|---|---|---|---|---|
| | Width a — | Width b — | 2b/ (a + b) — | Maximum peak height H % | Maximum peak particle diameter D μm | Average circularity AC — | Number ratio NR % | Evaluation Color streaks |
| Example 1 | 0.11 | 1.20 | 1.83 | 18 | 1.1 | 0.88 | 1.2 | A+ |
| Example 2 | 0.20 | 1.10 | 1.69 | 16 | 1.2 | 0.91 | 1.5 | A+ |
| Example 3 | 0.56 | 1.30 | 1.40 | 13 | 1.2 | 0.85 | 1.3 | C |
| Example 4 | 0.30 | 1.20 | 1.60 | 18 | 1.2 | 0.88 | 1.2 | A |
| Example 5 | 0.07 | 1.40 | 1.90 | 17 | 1.3 | 0.92 | 1.6 | A |
| Example 6 | 0.04 | 1.40 | 1.95 | 15 | 1.2 | 0.85 | 1.4 | C |
| Example 7 | 0.10 | 0.40 | 1.60 | 21 | 1.1 | 0.93 | 1.8 | B |
| Example 8 | 0.20 | 0.50 | 1.43 | 20 | 1.5 | 0.88 | 1.6 | A |
| Example 9 | 0.13 | 0.75 | 1.70 | 18 | 1.4 | 0.87 | 1.9 | A |
| Example 10 | 0.10 | 1.50 | 1.88 | 14 | 1.7 | 0.88 | 1.4 | A |
| Example 11 | 0.13 | 2.00 | 1.88 | 20 | 0.9 | 0.91 | 1.5 | A |
| Example 12 | 0.15 | 2.20 | 1.87 | 13 | 1.5 | 0.91 | 1.4 | B |
| Example 13 | 0.12 | 1.20 | 1.82 | 4 | 1.2 | 0.89 | 1.7 | B |
| Example 14 | 0.14 | 1.20 | 1.79 | 5 | 1.1 | 0.86 | 1.2 | A− |
| Example 15 | 0.14 | 1.50 | 1.83 | 10 | 1.5 | 0.81 | 2 | A |
| Example 16 | 0.13 | 1.40 | 1.83 | 24 | 1.4 | 0.86 | 1.9 | A |
| Example 17 | 0.12 | 1.30 | 1.83 | 38 | 1.2 | 0.83 | 1.4 | A− |
| Example 18 | 0.18 | 1.50 | 1.79 | 41 | 1.3 | 0.94 | 1.4 | B |
| Example 19 | 0.14 | 1.40 | 1.82 | 11 | 0.4 | 0.92 | 1.8 | B |
| Example 20 | 0.13 | 1.30 | 1.82 | 16 | 0.5 | 0.89 | 1.9 | A− |
| Example 21 | 0.15 | 1.20 | 1.78 | 21 | 0.75 | 0.88 | 1.7 | A |
| Example 22 | 0.12 | 1.40 | 1.84 | 21 | 2 | 0.87 | 1.9 | A |
| Example 23 | 0.14 | 1.40 | 1.82 | 20 | 3 | 0.88 | 1.4 | A− |
| Example 24 | 0.12 | 1.20 | 1.82 | 18 | 3.5 | 0.91 | 1.5 | B |
| Example 25 | 0.18 | 1.30 | 1.76 | 14 | 1.5 | 0.7 | 1.3 | B |
| Example 26 | 0.14 | 1.50 | 1.83 | 16 | 1.7 | 0.76 | 1.6 | A |
| Example 27 | 0.14 | 1.50 | 1.83 | 21 | 1.4 | 0.99 | 1.7 | A |

TABLE 1-2-continued

| | Collected toner Titanic acid metal salt particles | | | | | | | |
|---|---|---|---|---|---|---|---|---|
| | Particle size distribution curve | | | | | | | |
| | Width a — | Width b — | 2b/(a + b) — | Maximum peak height H % | Maximum peak particle diameter D μm | Average circularity AC — | Number ratio NR % | Evaluation Color streaks |
| Example 28 | 0.11 | 1.20 | 1.83 | 18 | 1.1 | 0.88 | 0.2 | B |
| Example 29 | 0.11 | 1.20 | 1.83 | 18 | 1.1 | 0.88 | 0.3 | A |
| Example 30 | 0.11 | 1.20 | 1.83 | 18 | 1.1 | 0.88 | 3.5 | A |
| Example 31 | 0.11 | 1.20 | 1.83 | 18 | 1.1 | 0.88 | 3.7 | B |
| Example 32 | 0.14 | 1.30 | 1.81 | 19 | 1.5 | 0.92 | 2.4 | B |
| Example 33 | 0.19 | 1.50 | 1.78 | 14 | 1.7 | 0.89 | 2.7 | B |
| Example 34 | 0.15 | 1.30 | 1.79 | 20 | 0.9 | 0.91 | 2.1 | A– |
| Comparative Example 1 | 0.60 | 1.20 | 1.33 | 19 | 1.3 | 0.95 | 1.2 | D |
| Comparative Example 2 | 0.03 | 1.50 | 1.96 | 18 | 1.1 | 0.88 | 2.3 | D |

As can be seen from the above-described results, compared to the image forming devices of the comparative examples, the image forming devices of the present examples can suppress the generation of color streaks that are generated when an image having a low image density is formed in a high-temperature and high-humidity environment after an image having a high image density is repeatedly formed.

Appendix (((1)))

An image forming device comprising:

an image holding member;

a charging device configured to charge a surface of the image holding member; an electrostatic charge image forming device configured to form an electrostatic charge image on the surface of the image holding member that has been charged;

a developing device configured to contain a developer containing toner, supply the developer, and develop the electrostatic charge image formed on the surface of the image holding member into a toner image;

a transfer device configured to transfer the toner image formed on the surface of the image holding member onto a surface of a recording medium;

a cleaning device including a cleaning blade configured to clean the surface of the image holding member; and a fixing device configured to fix the toner image on the surface of the recording medium, wherein the cleaning blade recovers a recovered toner containing toner particles and metal titanate particles, and the metal titanate particles exhibit a particle size distribution curve satisfying Expression (1), $$1.4 \leq 2b/(a+b) \leq 1.95 \quad \text{Expression (1)}$$

where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

(((2)))

The image forming device according to (((1))), wherein the particle size distribution curve of the metal titanate particles satisfies Expression (2), $$1.6 \leq 2b/(a+b) \leq 1.9 \quad \text{Expression (2)}$$

where a is the width on the smaller diameter side with respect to the perpendicular line at the 50% height of the maximum peak height, the perpendicular line being drawn from the maximum peak of the particle size distribution curve, and b is the width on the larger diameter side with respect to the perpendicular line at the 50% height of the maximum peak height.

(((3)))

The image forming device according to (((1))) or (((2))), wherein the width b in the particle size distribution curve of the metal titanate particles is 0.5 μm or more and 2.0 μm or less, and the maximum peak height of the particle size distribution curve of the metal titanate particles is 5% or more and 40% or less.

(((4)))

The image forming device according to (((3))), wherein the width b in the particle size distribution curve of the metal titanate particles is 0.75 μm or more and 1.5 μm or less, and the maximum peak height in the particle size distribution curve of the metal titanate particles is 10% or more and 25% or less.

(((5)))

The image forming device according to any one of (((1))) to (((4))), wherein the metal titanate particles have a particle diameter of 0.5 μm or more and 3.0 μm or less at the maximum peak in the particle size distribution curve.

(((6)))

The image forming device according to (((5))), wherein the particle diameter at the maximum peak in the particle size distribution curve of the metal titanate particles is 0.75 μm or more and 2.0 μm or less.

(((7)))

The image forming device according to any one of (((1))) to (((6))), wherein the metal titanate particles have an average circularity of 0.75 or more and 1.0 or less.

(((8)))

The image forming device according to any one of (((1))) to (((7))), wherein in the recovered toner, a number ratio of the metal titanate particles to the toner particles is 0.3 number % or more and 3.5 number % or less.

(((9)))

The image forming device according to any one of (((1))) to (((8))), wherein the metal titanate particles are strontium titanate particles.

(((10)))

The image forming device according to (((9))), wherein the strontium titanate particles contain a dopant.

(((11)))

The image forming device according to (((10))), wherein the dopant is silica or lanthanum.

(((12)))

A process cartridge attachable to and detachable from an image forming device, the process cartridge comprising:

an image holding member;

a charging device configured to charge a surface of the image holding member;

an electrostatic charge image forming device configured to form an electrostatic charge image on the surface of the image holding member that has been charged;

a developing device configured to contain a developer containing toner, supply the developer, and develop the electrostatic charge image formed on the surface of the image holding member into a toner image; and a cleaning device including a cleaning blade configured to clean the surface of the image holding member, wherein the cleaning blade recovers a recovered toner containing toner particles and metal titanate particles, and the metal titanate particles exhibit a particle size distribution curve satisfying Expression (1), $$1.4 \leq 2b/(a+b) \leq 1.95 \qquad \text{Expression (1)}$$

where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

What is claimed is:

1. An image forming device comprising:

an image holding member;

a charging device configured to charge a surface of the image holding member;

an electrostatic charge image forming device configured to form an electrostatic charge image on the surface of the image holding member that has been charged;

a developing device configured to contain a developer containing toner, supply the developer, and develop the electrostatic charge image formed on the surface of the image holding member into a toner image;

a transfer device configured to transfer the toner image formed on the surface of the image holding member onto a surface of a recording medium;

a cleaning device including a cleaning blade configured to clean the surface of the image holding member; and a fixing device configured to fix the toner image on the surface of the recording medium, wherein the cleaning blade recovers a recovered toner containing toner particles and metal titanate particles, and the metal titanate particles exhibit a particle size distribution curve satisfying Expression (1), $$1.4 \leq 2b/(a+b) \leq 1.95 \qquad \text{Expression (1)}$$

where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

2. The image forming device according to claim 1, wherein the particle size distribution curve of the metal titanate particles satisfies Expression (2), $$1.6 \leq 2b/(a+b) \leq 1.9 \qquad \text{Expression (2)}$$

where a is the width on the smaller diameter side with respect to the perpendicular line at the 50% height of the maximum peak height, the perpendicular line being drawn from the maximum peak of the particle size distribution curve, and b is the width on the larger diameter side with respect to the perpendicular line at the 50% height of the maximum peak height.

3. The image forming device according to claim 1, wherein the width b in the particle size distribution curve of the metal titanate particles is 0.5 μm or more and 2.0 μm or less, and the maximum peak height of the particle size distribution curve of the metal titanate particles is 5% or more and 40% or less.

4. The image forming device according to claim 3, wherein the width b in the particle size distribution curve of the metal titanate particles is 0.75 μm or more and 1.5 μm or less, and the maximum peak height in the particle size distribution curve of the metal titanate particles is 10% or more and 25% or less.

5. The image forming device according to claim 1, wherein the metal titanate particles have a particle diameter of 0.5 μm or more and 3.0 μm or less at the maximum peak in the particle size distribution curve.

6. The image forming device according to claim 5, wherein the particle diameter at the maximum peak in the particle size distribution curve of the metal titanate particles is 0.75 μm or more and 2.0 μm or less.

7. The image forming device according to claim 1, wherein the metal titanate particles have an average circularity of 0.75 or more and 1.0 or less.

8. The image forming device according to claim 1, wherein in the recovered toner, a number ratio of the metal titanate particles to the toner particles is 0.3 number % or more and 3.5 number % or less.

9. The image forming device according to claim 1, wherein the metal titanate particles are strontium titanate particles.

10. The image forming device according to claim 9, wherein the strontium titanate particles contain a dopant.

11. The image forming device according to claim 10, wherein the dopant is silica or lanthanum.

12. A process cartridge attachable to and detachable from an image forming device, the process cartridge comprising:

an image holding member;

a charging device configured to charge a surface of the image holding member;

an electrostatic charge image forming device configured to form an electrostatic charge image on the surface of the image holding member that has been charged;

a developing device configured to contain a developer containing toner, supply the developer, and develop the electrostatic charge image formed on the surface of the image holding member into a toner image; and a cleaning device including a cleaning blade configured to clean the surface of the image holding member, wherein the cleaning blade recovers a recovered toner containing toner particles and metal titanate particles, and the metal titanate particles exhibit a particle size distribution curve satisfying Expression (1), $$1.4 \leq 2b/(a+b) \leq 1.95 \qquad \text{Expression (1)}$$

where a is a width on a smaller diameter side with respect to a perpendicular line at a 50% height of a maximum peak height, the perpendicular line being drawn from a maximum peak of the particle size distribution curve, and b is a width on a larger diameter side with respect to the perpendicular line at the 50% height of the maximum peak height.

* * * * *